US012757243B2

(12) United States Patent
Chen et al.

(10) Patent No.: US 12,757,243 B2
(45) Date of Patent: Oct. 6, 2026

(54) SELECTIVE RECEIVER-ASSISTED CHANNEL SENSING

(71) Applicant: QUALCOMM Incorporated, San Diego, CA (US)

(72) Inventors: Siyi Chen, Beijing (CN); Arumugam Chendamarai Kannan, San Diego, CA (US); Changlong Xu, Beijing (CN); Jing Sun, San Diego, CA (US); Xiaoxia Zhang, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 18/261,027

(22) PCT Filed: Apr. 1, 2021

(86) PCT No.: PCT/CN2021/084890
§ 371 (c)(1),
(2) Date: Jul. 11, 2023

(87) PCT Pub. No.: WO2022/205298
PCT Pub. Date: Oct. 6, 2022

(65) Prior Publication Data

US 2024/0073940 A1 Feb. 29, 2024

(51) Int. Cl.
*H04W 74/00* (2009.01)
*H04W 74/08* (2024.01)
*H04W 74/0808* (2024.01)

(52) U.S. Cl.
CPC ..... *H04W 74/002* (2013.01); *H04W 74/0808* (2013.01)

(58) Field of Classification Search
CPC ........................ H04W 74/002; H04W 74/0808
See application file for complete search history.

(56) References Cited

U.S. PATENT DOCUMENTS

2017/0150524 A1* 5/2017 Oh .................... H04W 74/0808
2019/0335504 A1 10/2019 Chakraborty et al.
(Continued)

FOREIGN PATENT DOCUMENTS

CN 111480388 A 7/2020
WO 2019160767 A1 8/2019

OTHER PUBLICATIONS

International Search Report and Written Opinion—PCT/CN2021/084890—ISA/EPO—Jan. 5, 2022.
(Continued)

*Primary Examiner* — Gbemileke J Onamuti
(74) *Attorney, Agent, or Firm* — Harrity & Harrity, LLP

(57) ABSTRACT

Wireless communication methods and devices for selective receiver-assisted channel sensing are provided. In some aspects, one or more receivers (e.g., UEs) can be selectively configured to perform receiver-assisted channel sensing (e.g., class A channel sensing) using at least one of trigger signaling and channel sensing configuration by a BS, UE capabilities, or operational mode. For example, a method for wireless communication performed by a user equipment (UE) includes: sensing a channel based on at least one of a receiver-assisted channel sensing trigger, or a UE capability; and transmitting, to a base station (BS) based on the sensing, channel sensing information.

30 Claims, 12 Drawing Sheets

(56) References Cited

U.S. PATENT DOCUMENTS

| | | | | |
|---|---|---|---|---|
| 2020/0221495 A1* | 7/2020 | Chen | ................... | H04W 72/044 |
| 2021/0007147 A1* | 1/2021 | Yang | ................... | H04W 56/001 |
| 2021/0058967 A1* | 2/2021 | Oteri | ...................... | H04W 72/23 |
| 2022/0124806 A1* | 4/2022 | Hu | ......................... | H04W 16/28 |
| 2022/0312477 A1* | 9/2022 | Niu | ................... | H04W 74/0808 |
| 2023/0041484 A1* | 2/2023 | Liu | ........................ | H04W 16/28 |
| 2024/0163867 A1* | 5/2024 | Bagheri | ............ | H04W 72/1263 |

OTHER PUBLICATIONS

Moderator (Qualcomm Incorporated): "Email Discussion on Channel Access Mechanism for 52.6GHz-71GHz Band, Version 2", R1-2007193, 3GPP TSG RAN WG1 Meeting #102-e, Aug. 17-24, 2020, pp. 25-26, pp. 1-33.

Moderator (Qualcomm Incorporated): "Email Discussion Summary for Channel Access Mechanism for 52.6GHz-71GHz Band, ver01" R1-2101887, 3GPP TSG RAN WG1 Meeting#104-e, Jan. 25-Feb. 5, 2021, the whole document, pp. 1-65, XP051975969, Retrieved from the Internet: URL: https://ftp.3gpp.org/tsg_ran/WG1_RL1/TSGR1_104-e/Docs/R1-2101887.zip R1-2101887 8.2.6 Email Discussion Summary for Channel Access for 52.6-71GHz_v01.docx [Retrieved on Jan. 30, 2021] p. 3 p. 25.

Moderator (Qualcomm Incorporated): "FL Summary for Channel Access Mechanism for 52.6GHz-71GHz Band", R1-2009344, Oct. 26-Nov. 13, 2020, Nov. 13, 2020 (Nov. 13, 2020) the whole document, pp. 1-24.

Qualcomm Incorporated: "Channel Access Mechanisms for NR in 52.6 to 71GHz Band," 3GPP TSG RAN WG1 Meeting #104-e, R1-2101458, Jan. 25-Feb. 5, 2021, pp. 1-8, section 3.1, the whole document.

TCL Communication: "Wideband Carrier Usage for NR-U", 3GPP TSG RAN WG1 Meeting #94bis, 3GPP Draft; R1-1811084_Wideband_Operation_for_NR-U_TCL_Final, 3rd Generation Partnership Project (3GPP), Mobile Competence Centre; 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), 4 Pages, XP051518485, Section 2, Section 2.4.

Xiaomi: "Channel Access Mechanism for NR on 52.6-71 GHz", R1-2101113, 3GPP TSG RAN WG1 #104, e-Meeting, Jan. 25-Feb. 13, 2021, Sections 2.2-2.3, pp. 1-3.

* cited by examiner

SELECTIVE RECEIVER-ASSISTED CHANNEL SENSING

CROSS-REFERENCE TO RELATED APPLICATIONS

The present application is a 35 U.S.C. 371 National Phase entry of Patent Cooperation Treaty (PCT) Application No. PCT/CN2021/084890, filed Apr. 1, 2021, which is hereby expressly incorporated herein by reference in its entirety.

TECHNICAL FIELD

This application relates to wireless communication systems, and more particularly to systems, devices, and methods for receiver-assisted channel sensing.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. There are two types of LBT procedures, a load based equipment (LBE)-based LBT and a frame based equipment (FBE)-based LBT. In LBE-based LBT, channel sensing is performed at any time instant and random back-off is used if the channel is found busy. In FBE-based LBT, channel sensing is performed at predetermined time instants (e.g., associated with fixed frame periods (FFPs)). For instance, if the channel is busy, a transmitting node may back off for a predetermined time period and sense the channel again after this period.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure describes mechanisms for selective receiver-assisted channel sensing, in which one or more receivers (e.g., UEs) can be selectively configured to perform receiver-assisted channel sensing (e.g., class A channel sensing) using at least one of trigger signaling and channel sensing configuration by a BS, UE capabilities, or operational mode. For example, a BS may be configured to trigger a receiver-assisted channel sensing procedure based on interference measurements obtained by a UE. In some aspects, the BS may trigger the initial interference measurement, and the UE may return an interference measurement report indicating interference measurements in each of a plurality of beam directions. Based on the measurement report, the BS may determine whether the UE will assist with channel sensing, such as by performing a LBT. The BS may configure the UE with one or more parameters of the receiver-assisted channel sensing, such as the time/frequency resources for performing the channel sensing, the periodicity of the channel sensing, the type of channel sensing (e.g., CAT2 LBT, CAT4 LBT), and/or any other suitable parameter. The mechanisms described herein advantageously provide for selective activation of receiver-assisted channel sensing based on parameters and measurements that can reduce processing overhead for UEs that are less likely to detect ongoing communications in a shared frequency band, or that have limited communication capabilities or configurations (e.g., low power mode, limited bandwidth, etc.).

One aspect of the present disclosure includes a method for wireless communication performed by a user equipment (UE). The method includes: sensing a channel based on at least one of a receiver-assisted channel sensing trigger, or a UE capability; and transmitting, to a base station (BS) based on the sensing, channel sensing information.

One aspect of the present disclosure includes a user equipment (UE). The UE includes: a processor configured to sense a channel based on at least one of a receiver-assisted channel sensing trigger, or a UE capability; and a transceiver coupled with the transceiver and configured to transmit, to a base station (BS) based on the sensing, channel sensing information.

One aspect of the present disclosure includes a non-transitory. The program code includes code for causing a user equipment (UE) to sense a channel based on at least one of a receiver-assisted channel sensing trigger, or a UE capability. The program code also includes code for causing the UE to transmit, to a base station (BS) based on the sensing, channel sensing information.

One aspect of the present disclosure includes a user equipment (UE). The UE includes means for sensing a channel based on at least one of a receiver-assisted channel sensing trigger, or a UE capability; and means for transmitting, to a base station (BS) based on the sensing, channel sensing information.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1A:
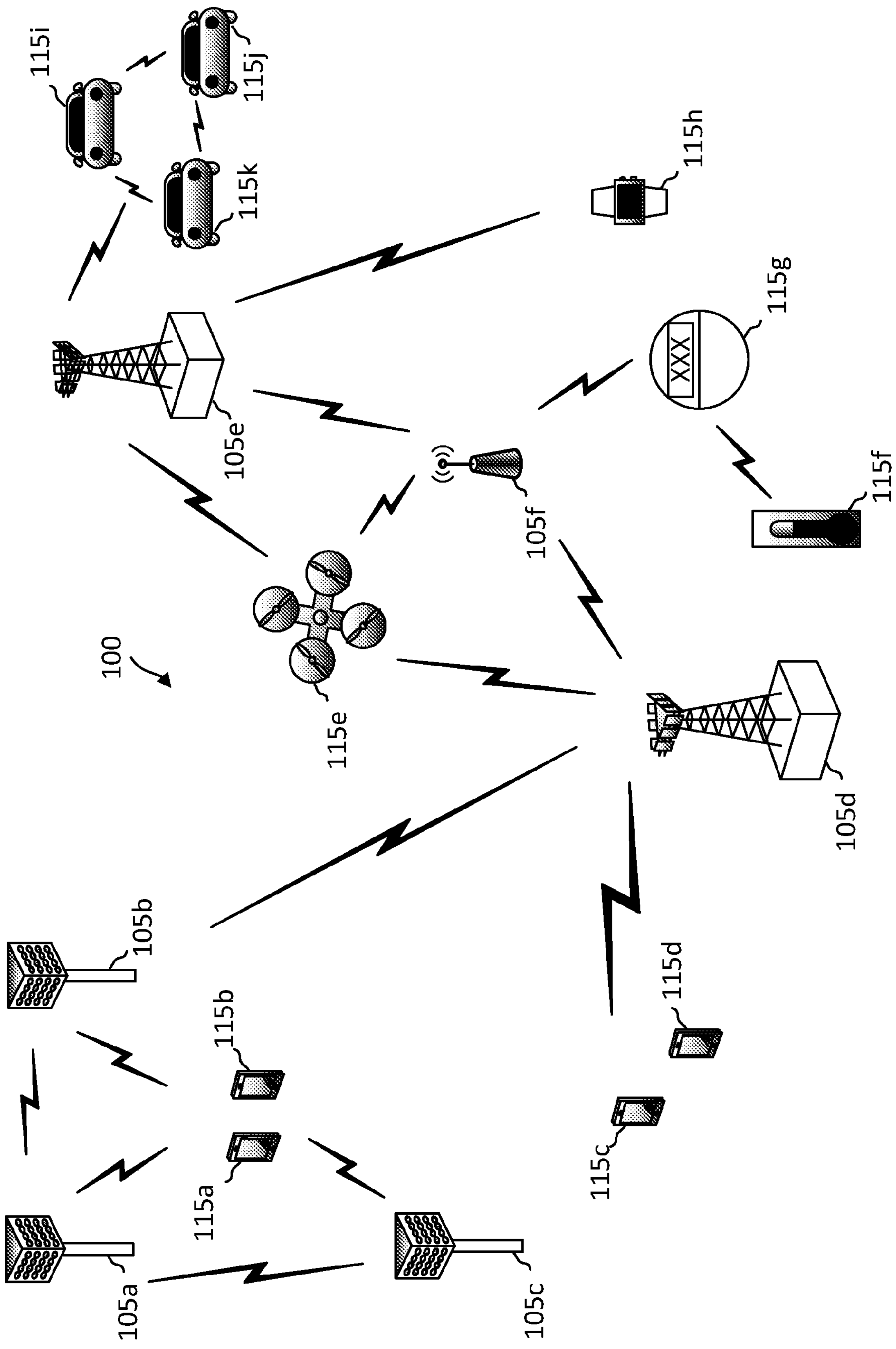
FIG. 1A illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present disclosure describes mechanisms for receiver-assisted channel sensing in shared frequency bands, including new radio-unlicensed (NR-U). In some instances, a BS may attempt to acquire time/frequency resources in a shared frequency band to transmit DL communications and/or schedule UL communications. Some aspects, the time/frequency resources may be referred to as a channel occupancy time (COT). The BS may perform a listen-before-talk (LBT) procedure, which includes measuring signal energy for a preconfigured amount of time to determine whether the shared frequency band is available. For example, there may be an ongoing communication link in the shared frequency band between a different BS and user equipment. The LBT procedure may prevent another node from transmitting in the shared frequency bands to reduce the probability of a collision. In some aspects, only the transmitter (e.g., a BS) attempting to use the resources in the shared frequency band performs the channel sensing. Thus, the channel sensing procedure may indicate the channel is occupied when a signal energy from a different ongoing communication link is detected at the transmitter. However, the transmitter may not have information associated with interference experienced at the receiver. This issue may be referred to as hidden node issues. That is, it is possible that interference from an ongoing communication link in the shared frequency band could be detectable at one or more receivers of the transmitter, but not at the transmitter. Accordingly, even though an LBT procedure may indicate that the shared frequency band is available at the transmitter, collisions may still occur at the receiver side due to the communications of the ongoing communication link in the shared frequency band. This issue may be particularly problematic in directional communications in the shared frequency band, such as transmitter and receiver beamforming in millimeter wave (mmWave) frequencies. Further, a transmitter may determine that the shared frequency band is unavailable based on detected signals from an ongoing communication link in the shared frequency band, even though the detected signals from the ongoing communication link may not pose a problem to the receiver.

As described in more detail below, the present disclosure describes mechanisms for selective receiver-assisted channel sensing, in which one or more receivers (e.g., UEs) can be selectively configured to perform receiver-assisted channel sensing (e.g., class A channel sensing) using at least one of trigger signaling and channel sensing configuration by a BS, UE capabilities, or operational mode. For example, a BS may be configured to trigger a receiver-assisted channel sensing procedure based on interference measurements obtained by a UE. In some aspects, the BS may trigger the initial interference measurement, and the UE may return an interference measurement report indicating interference measurements in each of a plurality of beam directions. Based on the measurement report, the BS may determine whether the UE will assist with channel sensing, such as by performing a LBT. The BS may configure the UE with one or more parameters of the receiver-assisted channel sensing, such as the time/frequency resources for performing the channel sensing, the periodicity of the channel sensing, the type of channel sensing (e.g., CAT2 LBT, CAT4 LBT), and/or any other suitable parameter.

In another aspect, a UE may determine whether to perform receiver-assisted channel sensing autonomously, based on a UE capability, an operational mode, or other suitable UE-based parameter. For example, a UE may be configured with periodic resources for performing interference measurements, and may determine whether to perform interference measurements in one or more of the configured periodic resources. If, for example, the UE has activated a power saving mode, the UE may refrain from performing interference measurements in one or more of the periodic resources. If the UE refrains from performing the interference measurement, the UE may transmit a simulated, or fake, interference measurement report to the BS indicating that the shared frequency band is available, for example.

In another aspect, a BS and/or a UE may determine whether to perform receiver-assisted channel sensing based on an operational mode of the UE. For example, the BS and/or the UE may determine whether to perform receiver-assisted channel sensing based on whether the UE has enabled carrier aggregation (CA) communication, dual connectivity (DC) communication, multiple transmission-reception point (multi-TRP) communication, or any other suitable operational mode.

The aspects described above advantageously provide for selective activation of receiver-assisted channel sensing based on parameters and measurements that can reduce processing overhead for UEs that are less likely to detect ongoing communications in a shared frequency band, or that have limited communication capabilities or configurations (e.g., low power mode, limited bandwidth, etc.). Thus, the mechanisms described herein provide receiver-assisted channel sensing in a way that limits or reduces overhead and other processing burdens in the network by selectively configuring UEs that are more likely to detect interference from ongoing communications, and/or that are better situated to perform the channel-sensing measurements without degrading performance (e.g., configured with CA/DC for larger bandwidth).

FIG. 1A illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. ABS for a small cell may be referred to as a small cell BS, a pico BS, a femto BS or a home BS. In the example shown in FIG. 1A, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1A, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105) may perform an LBT prior to transmitting in the channel. When the LBT passes, the transmitting node may proceed with the transmission during a channel occupancy time (COT). When the LBT fails, the transmitting node may refrain from transmitting in the COT. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. In some aspects, only the device attempting to transmit in the shared frequency band, the transmitter (e.g., the BS 105). In some aspects, a transmitter may configure one or more receivers (e.g., a UE 115) in the network to perform an LBT to assist the transmitter in determining whether the shared frequency band is available for communications.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In some aspects, the network 100 may utilize multiple TRPs to communicate with a UE 115, for example, to increase reliability, coverage, and/or capacity performance.

For instance, a BS 105 may be coupled to multiple TRPs and may communicate with a UE 115 via the multiple TRPs. As similarly discussed above, the multiple TRPs may also apply MIMO and beamforming techniques to communicate with the UE 115 and the UE 115 may feedback CSI for each of the TRPs. Mechanisms for reporting CSI for multiple TRPs are described in greater detail herein.

Figure 1B:
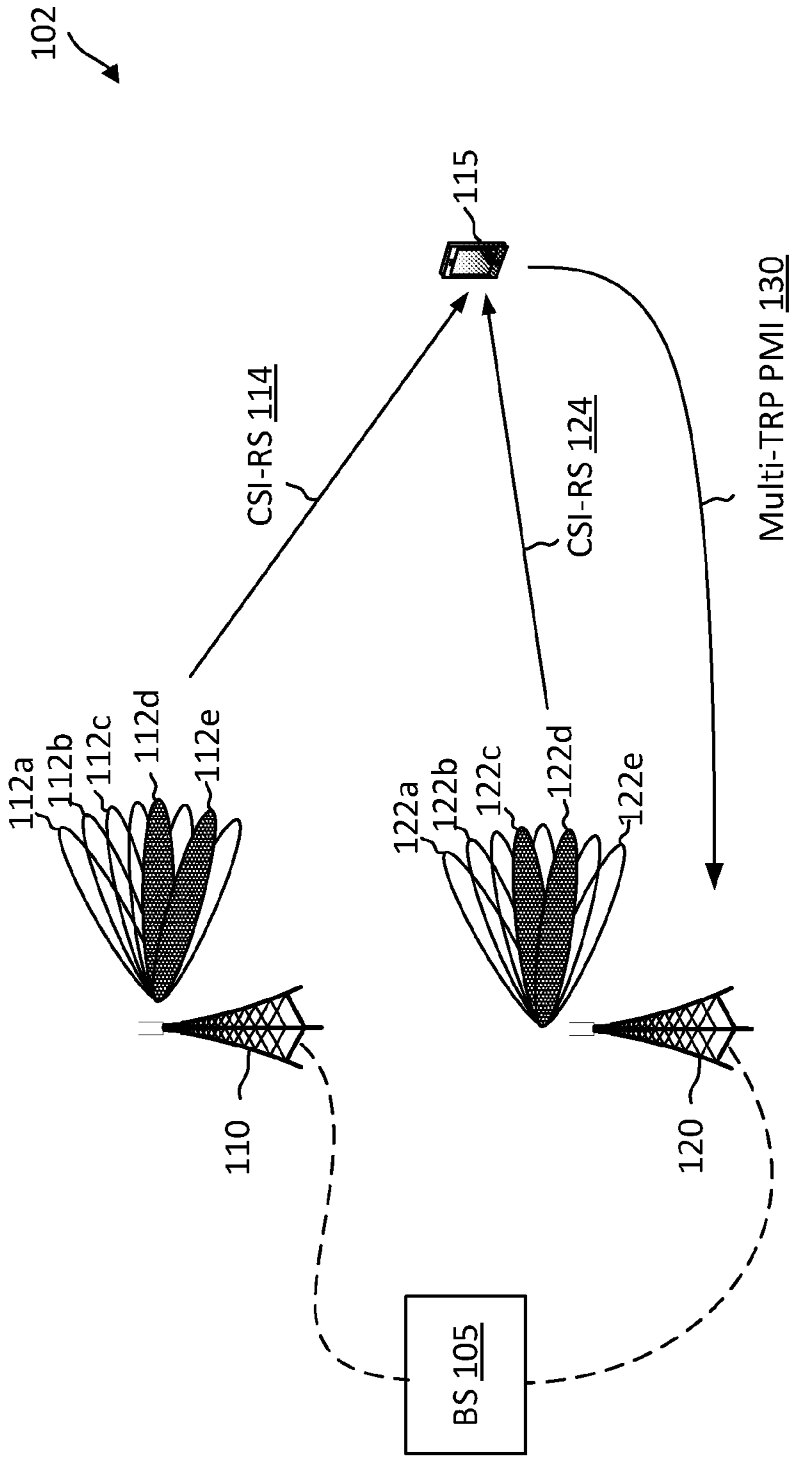
FIG. 1B illustrates a wireless communication network that implements multi-transmission-reception point (TRP) channel state information (CSI) reporting according to some aspects of the present disclosure.

FIG. 1B illustrates a wireless communication network 102 that implements multi-TRP CSI reporting according to some aspects of the present disclosure. The network 102 may correspond to a portion of the network 100. FIG. 1B illustrates two TRPs 110 and 120 in communication with one UE 115 for purposes of simplicity of discussion, though it will be recognized that embodiments of the present disclosure may scale to many more UEs 115 and/or TRPs 110 and 120. The UE 115 may be similar to the UEs 115. Each of the TRPs 110 and 120 may include a radio frequency (RF) frontend configured for wireless signal transmissions and receptions. The TRPs 110 and 120 may be coupled to a BS 105 similar to the BSs 105. In some instances, the TRPs 110 and/or 120 may be co-located with the BS 105. In some other instances, the TRPs 110 and/or 120 may be located at a remote location. In some instances, the TRPs 110 and/or 120 may have similar functionalities as a BS 105. For instance, certain BS operations, such as baseband processing and/or protocol processing, may be distributed to the TRPs 110 and/or 120. In some other instances, the baseband processing and/or protocol processing may be centralized at the BS 105.

In some aspects, each of the TRPs 110 and 120 and the UE 115 may have an array of antenna elements and may apply beamforming techniques to communicate with each other. The antenna array may be in the form of a single panel or multiple panels. Each antenna panel may include a plurality of antenna ports or elements in a vertical dimension and a plurality of antenna ports or elements in a horizontal dimension. In some examples, the TRPs 110 and 120 may each have multi-panel antennas and the UE 115 may have a single-panel antenna. In some other examples, the TRP 110, the TRP 120, and the UE 115 may each have multi-panel antennas. In the illustrated example of FIG. 1B, the TRP 110 may form beams 112 in an array of angular directions by weighting signal phases and amplitudes at the antenna elements. Similarly, the TRP 120 may form beams 122 in an array of angular directions. Each of the TRPs 110 and 120 may utilize the best beam to communicate with the UE 115. The best beam may refer to a high-quality beam, for example, where the beam may have a highest received signal power among a set of beams measured at the UE 115.

To facilitate the UE 115 in selecting the best beam(s) 112 from the TRP 110 and the best beam(s) 122 from the TRP 120, the TRP 110 may transmit CSI-RS 114 using one or more beams 112 and the TRP 120 may transmit CSI-RS 124 using one or more beams 122. Each of the CSI-RSs 114 and 124 may include a predetermined sequence or a sequence of predetermined pilot symbols. The TRP 110 may transmit the CSI-RS 114 at configured time and frequency locations and use one or more configured beams 112. Additionally, the TRP 110 may transmit the CSI-RS 114 using different beams 112 at different time and frequency and/or different combinations of beams 112 at different time and frequency. The TRP 110 may configure the UE 115 with the configured time and frequency resources and the configured beam(s) 112 for the transmission of the CSI-RS 114. The UE 115 may receive the CSI-RS(s) 114, perform measurements on the CSI-RS(s) 114, and determine a best beam 112 or a best combination of beams 112 for receiving a DL communication from the TRP 110. The TRP 120 may transmit the CSI-RS(s) 124 using substantially similar mechanisms as the TRP 110 and the UE 115 may perform similar measurements for the CSI-RS 124 as for the CSI-RS 114.

In the illustrated example of FIG. 1B, the best beams 112 from the TRP 110 to the UE 115 may correspond to the beam **112*a* and the beam 112*b* (shown by the pattern-filled beams). In some instances, the beam 112*a* and/or 112*b* may reach the UE 115 via a direct line-of-sight (LOS) path. In some instances, the beam 112*a* and/or 112*b* may reach the UE 115 via a non-direction LOS path, for example, scattering off a certain scatter or clusters in the environment. Similarly, the best beams 222 from the TRP 120 to the UE 115 may correspond to the beam 222*a* and the beam 222*b*** (shown by the pattern-filled beams).

In some aspects, the UE 115 may transmit a CSI report 130 to the BS 105 based on measurements obtained from the CSI-RS 114 and CSI-RS 124. Additionally or alternatively, the BS 105 may configure the UE 115 with interference measurement resources for interference measurements in association with the TRP 110 and 120. The UE 115 may report interference measurements to the BS 105. In some aspects, the BS 105 may communicate with the UE 115 via both the TRP 110 and the TRP 120 using coordinated multi-point (CoMP) based on the CSI report 130 and/or interference measurement report received from the UE 115. In other aspects, the BS 105 may communicate with the UE 115 via a single TRP 110 or 120 based on the CSI report 130 and/or interference measurement report received from the UE 115.

Figure 2:
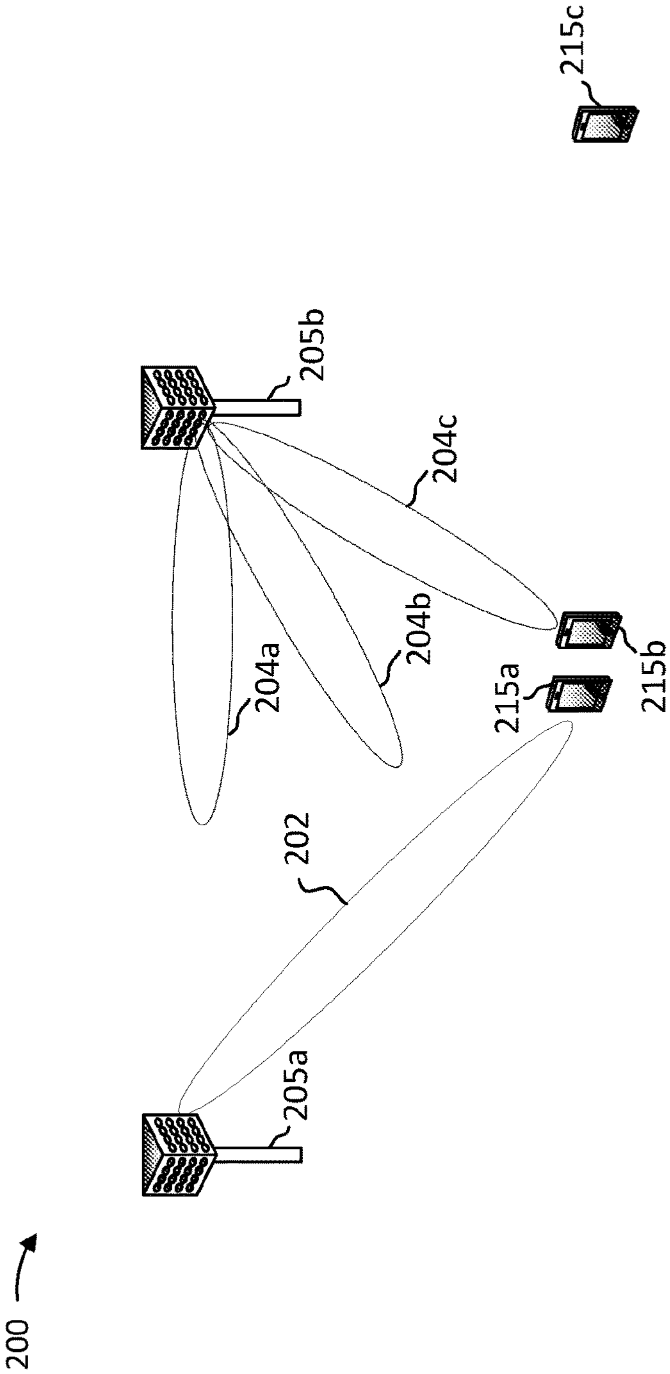
FIG. 2 illustrates a wireless communication scenario in a shared frequency band according to some aspects of the present disclosure.

In some instances, a wireless communication device, such as a BS, may desire to use time/frequency resources in a shared or unlicensed spectrum (e.g., NR-U). For example, the BS may contend for channel access in a shared frequency band by performing a listen-before-talk (LBT). The LBT may prevent or reduce the likelihood that another node may transmit is formed in a shared frequency band when there is an ongoing communication link present. The BS may perform a CAT2 LBT, or a CAT4 LBT to identify other wireless network devices which have ongoing communications in the shared frequency band. The BS may perform the LBT procedure in each of a plurality of beam directions using receive beamforming. If the sensed energy during the time period specified by the LBT configuration falls below a threshold, the BS acquires, or wins, a channel occupancy time (COT) in the unlicensed frequency band. In the COT, the BS may transmit downlink (DL) communications to a UE and/or schedule uplink (UL) communications from the UE. Although the LBT procedure may help to reduce collisions between devices attempting to communicate in a shared frequency band, LBT procedures performed only by the transmitter (e.g., BS) may not detect interference which could adversely affect the receiver (UE). In this regard, FIG. 2 illustrates a communication scenario 200 in which a plurality of BSs 205 is communicating, or attempting to communicate, with respective UEs 215. In particular, the BS **205*a* and the UE 215*a* have ongoing communications in a shared frequency band. The BS 205*a* transmits a communication signal to the UE 215*a* in a beam 202**, which has a beam direction and beam width.

A second BS **205*b* may desire to communicate in the same shared frequency band used by the first BS 205*a*. Accordingly, the second BS 205*b* uses a directional LBT procedure, which includes using receive beamforming to detect signal energy in each of a plurality of beam directions 204*a*, 204*b*, 204*c* for a specified time period. However, the second BS 205*b*** may not detect signal energy transmitted by the first BS

205*a*. In that regard, because the first BS 205*a* uses beamforming to focus signal energy in specific beam directions (e.g., 202), the first BS 205*a* may not transmit in beam directions that are likely to impinge on the second BS 205*b*, and thus the second BS 205*b* may not be able to detect signals from the first BS 205*a*. However, the signal energy transmitted by the first BS 205*a* may reach the second UE 215*b*, as shown in FIG. 2. Accordingly, if only the second BS 205*b* performs an LBT and wins a COT in the shared frequency band, DL communications transmitted by the second BS 205*b* to the second UE 215*b* may result in a collision with communications transmitted by the first BS 205*a* (e.g., in the beam 202).

Aspects of the present disclosure provide mechanisms for receiver-assisted channel sensing, and in particular to receiver-assisted channel sensing mechanisms in directional (beam-based) communication scenarios. For example, the second BS 205*b* may configure the second UE 215*b* to perform a channel sensing procedure and return a channel sensing report to assist the second BS 205*b* with the channel sensing procedure. The second BS 205*b* may configure the second UE 215*b* to perform the receiver-assisted channel sensing periodically and/or each time the second BS 205*b* performs an LBT procedure to win a COT in the shared frequency band.

In some aspects, the second BS 205*b* may configure both the second UE 215*b* and a third UE 215*c* to perform the receiver-assisted channel sensing. However, it will be understood that performing the receiver-assisted channel sensing may create significant processing overhead for the UEs 215*b*, 215*c*. Further, as shown in FIG. 2, the third UE 215*c*, may be significantly less likely to experience interference from the transmitting nodes of the ongoing communication link (e.g., the first BS 205*a*). Thus, requiring all UEs, including the third UE 215*c*, which have a communication link with the second BS 205*b* may result in a waste of the third UE's 215*c* processing resources or other network inefficiencies. The present disclosure describes mechanisms for selectively configuring wireless communication devices to perform receiver-assisted channel sensing, such as LBT. For example, the second BS 205*b* may configure one or more UEs to perform channel sensing based on interference measurements reported by the UEs, based on UE operation modes (e.g., carrier aggregation, dual connectivity, multi-TRP). In another example, a UE may determine whether to perform receiver-assisted channel sensing autonomously, based on UE capabilities, power status, or other parameters. Accordingly, BS and/or UE configurations may provide for receiver-assisted channel sensing selectively to reduce potential inefficiencies or other adverse effects associated with the channel sensing configuration.

Figure 3:
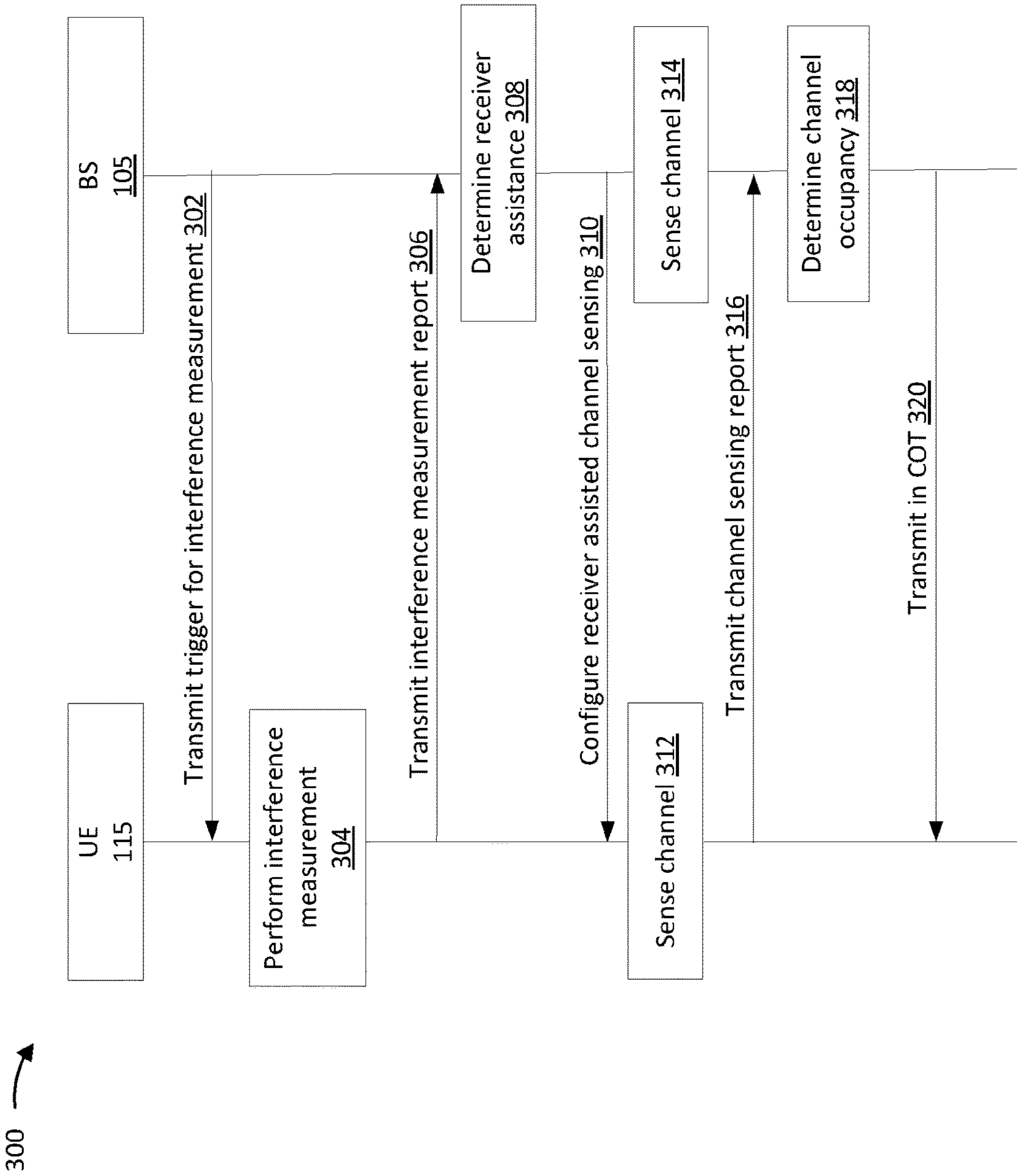
FIG. 3 is a signaling diagram illustrating a method for selective receiver-assisted channel sensing according to some aspects of the present disclosure.

FIG. 3 is a signaling diagram illustrating a method 300 for receiver-assisted channel sensing, according to some aspects of the present disclosure. The method 300 is performed by a BS 105 and a UE 115. The BS may be one of the BSs 105 of the network 100 or the network 102, or one of the BSs 205 shown in FIG. 2. The UE 115 may be one of the UEs 115 of the network 100 or 102, or one of the UEs 215 shown in FIG. 2. In the method 300, the BS 105 instructs or triggers the UE 115 to perform an interference measurement, and determines whether to configure the UE to assist with channel sensing (e.g., class A channel sensing) based on an interference measurement report returned by the UE.

At action 302, the BS 105 transmits a trigger for an interference measurement. For example, the BS 105 may transmit a trigger including a configuration for performing an interference measurement. The configuration transmitted by the BS 105 may configure the UE 115 to perform a measurement of signal energy, signal quality, or a signal-to-interference ratio (SINR). For example, the BS 105 may configure the UE 115 to perform a received signal strength indicator (RSSI), a layer 1-SINR (L1-SINR), or any other suitable type of signal measurement. In some aspects, action 302 may include the BS 105 configuring the UE 115 with one or more interference measurement resources for the UE 115 to perform the interference measurement. Further, the interference measurement configuration transmitted by the BS 105 may indicate one or more beams or beam directions associated with the interference measurement resources, for example, so that the UE 115 may perform the interference measurement in receive beam directions corresponding to the beam directions associated with the interference measurement resources. In some aspects, the BS 105 may perform action 302 by transmitting an RRC configuration which indicates the parameters associated with the interference measurement. In other aspects, the UE 115 may determine one or more parameters of the interference measurement autonomously, based on UE configurations and/or capabilities, for example.

At action 304, the UE 115 performs one or more interference measurements based on the trigger or configuration transmitted by the BS 105 at action 302. As explained above, performing the interference measurement may include measuring a RSSI, a L1-SINR, or any other suitable type of measurement. Further, the UE 115 may use receive beamforming to measure interference in one or more beam directions. In some aspects, the UE 115 may perform an interference measurement in a single time period or window. In other aspects, the UE 115 may perform the interference measurement in each of a plurality of time periods or windows.

At action 306, the UE 115 transmits an interference measurement report, based on the interference measurement performed at action 304, to the BS 105. In some aspects, the measurement report may indicate a directional RSSI for each of a plurality of beam directions. In some aspects, the measurement report may include a channel state information (CSI), such as an aperiodic-CSI (AP-CSI), which indicates the L1-SINR for one or more measured beam directions. In other aspects, the UE 115 may determine what type of reporting to transmit to the BS 105. Additionally, the UE 115 may indicate in the measurement report a preference for a receiver-assisted channel sensing configuration. For example, based on the interference measurement, the UE 115 may be configured to indicate a preference of whether or not the UE 115 performs the channel sensing, or in which beam or beams the UE 115 prefers to perform channel sensing. In some aspects, the UE 115 may indicate a preferred beam direction by indicating the beam information associated with the interference measurement resource where a measured interference from the interference measurement resource is the lowest among the interference measurement resources.

At action 308, the BS 105 determines, based on the interference measurement report transmitted action 306, whether to configure the UE 115 to perform receiver-assisted channel sensing. For example, in some aspects, the BS 105 may compare the interference measurement indicated in the interference measurement report 306 to a threshold. In some aspects, the BS 105 may compare interference measurements associated with each of a plurality of beam directions to corresponding thresholds, and determine which, if any, beam directions the BS 105 will configure for receiver-assisted channel sensing. In some aspects, action

308 also includes determining one or more parameters associated with the receiver-assisted channel sensing. For example, the BS 105 may determine a semi-static set of parameters for the UE 115 to perform the channel sensing. The configured set of resources may be periodic in some aspects, and may be associated with particular beam directions (see FIG. 5).

At action 310, the BS 105 transmits, to the UE 115, the receiver-assisted channel sensing configuration. In some aspects, the receiver-assisted channel sensing configuration may be associated with a class A channel sensing protocol. In some aspects, a receiver configured to perform class A channel sensing is configured to perform and report channel sensing measurements for every channel sensing resource configured by the transmitter. The BS 105 may indicate the receiver-assisted channel sensing parameters using a RRC configuration, for example. In other aspects, the BS 105 may trigger the UE 115 to perform channel sensing using pre-COT signaling, such as a PDCCH DCI_message. For example, each time the BS 105 prepares to acquire a COT, the BS 105 may indicate which UEs and/or beams will be used for channel sensing. In this way, the BS 105 may determine receiver-assisted channel sensing more granularly, and may trigger receiver-assisted channel sensing for each transmission opportunity. In other aspects, the BS 105 may trigger one or more UEs, including the UE 115, to perform channel sensing during a medium access control-control element (MAC-CE)-based beam switch command, and may indicate which of the beams will be used for channel sensing. For example, the BS 105 may request the UE 115 to switch from a first beam direction to a second different beam direction, and the UE 115 may perform subsequent channel sensing the second beam direction until a next beam-switch command or MAC-CE command is received.

At action 312, the UE 115 performs the receiver-assisted channel sensing. At action 314, the BS 105 also performs channel sensing. As mentioned above, performing the receiver-assisted channel sensing may include performing a LBT procedure such as a CAT2 LBT, or a CAT4 LBT. Accordingly, the UE 115 may measure a signal energy or power during a sensing period, which may include a deferral period and one or more back off periods, which may be determined based on a random number. In some aspects, both the BS 105 and the UE 115 perform the same type of channel sensing, such as a CAT2 LBT or a CAT4 LBT. Another aspects, the BS 105 performs a different type of channel sensing than the UE 115. In some aspects, actions 312 and/or 314 include using receive beamforming to sense the channel energy in each of a plurality of beam directions.

In some aspects, the UE 115 and the BS 105 may perform the actions 310, 312, and 314 in various orders. In one aspect, action 314 may be performed before actions 310 and 312. For example, the BS 105 may first perform channel sensing (e.g., CAT4 LBT) to initiate a COT. The BS 105 may then transmit, and the UE 115 may receive during the BS 105's COT, a pre-COT signal to enable the receiver-assisted channel sensing. The UE 115 may perform the channel sensing (e.g., CAT4 LBT, CAT2 LBT) based on the pre-COT signal. In another aspect, the UE 115 performs the channel sensing (e.g., a CAT4 LBT) in response to receiving a pre-COT signal transmitted by the BS 105. The pre-COT signal may enable the receiver-assisted channel sensing for the UE 115. The UE 115 may initiate the COT, and share the COT with the BS 105.

At action 316, the UE 115 transmits a channel sensing report to the BS 105. The channel sensing report may indicate signal measurements for each of a plurality of beam directions (e.g., in decibels (dB)). In some aspects, transmitting the channel sensing report may include transmitting a PUCCH uplink control information (UCI) message to the BS 105.

At action 318, the BS 105 determines, based on the measurements obtained at actions 312 and 314, whether the shared frequency band is available for a channel occupancy time (COT). For example, action 318 may include comparing the measurements obtained at actions 312 and 314 to respective thresholds. In particular, comparing the measurements obtained at actions 312 and 314 to measurements for each of a plurality of beam directions to respective threshold, and determining based on the comparison whether the shared frequency band is available.

If the BS 105 determines that the shared frequency band is available during the COT, the BS 105 acquires or "wins" the COT, and may transmit DL communications to the UE 115 at action 320.

Figure 4A:
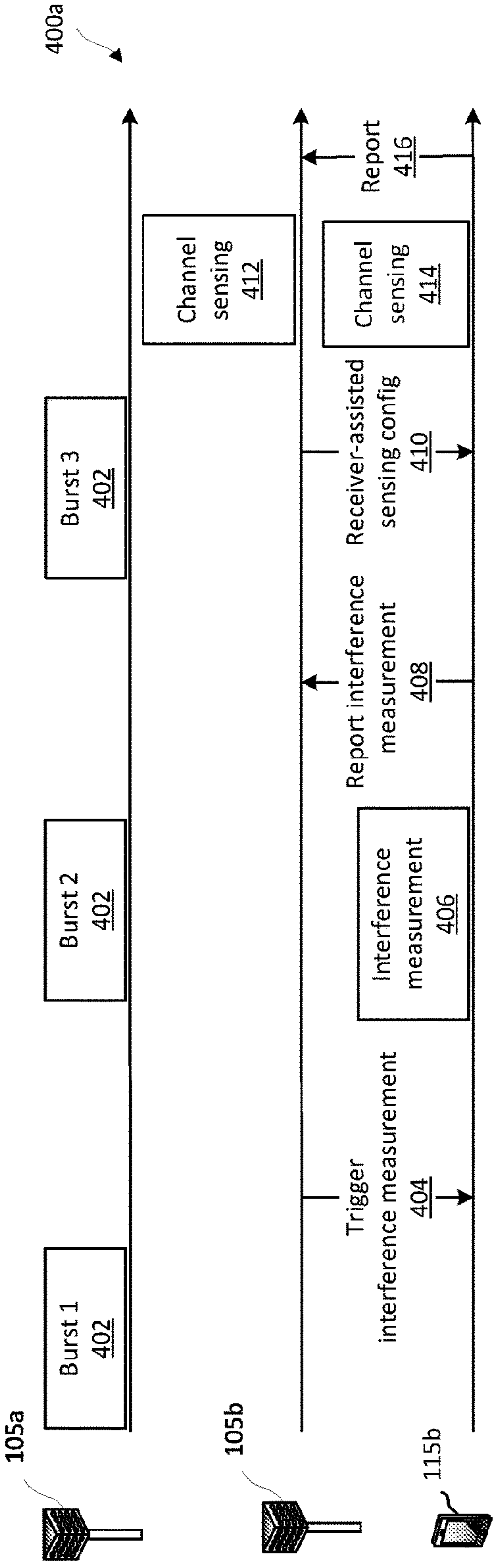
FIG. 4A illustrates a scheme for selectively configuring a user equipment (UE) for receiver-assisted channel sensing based on one or more triggers provided by a base station (BS) according to some aspects of the present disclosure.
Figure 4B:
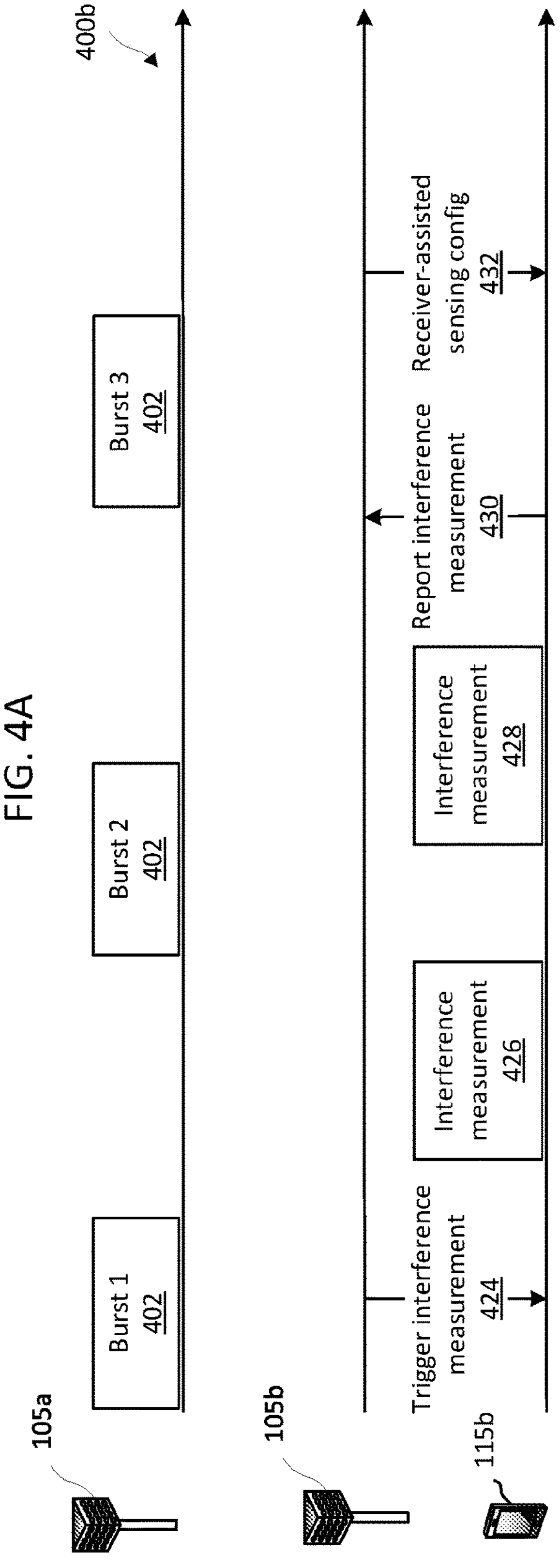
FIG. 4B illustrates a scheme for selectively configuring a user equipment (UE) for receiver-assisted channel sensing based on one or more triggers provided by a base station (BS) according to some aspects of the present disclosure.

As mentioned above, aspects of the present disclosure provide mechanisms for selective receiver-assisted channel sensing which may be: 1) triggered by a BS, 2) determined autonomously by the UE, and/or 3) determined based on network/device configurations or operational modes. FIGS. 4A and 4B illustrate schemes 400*a*, 400*b* for selectively configuring a UE 115*b* for receiver-assisted channel sensing based on one or more triggers provided by a BS 105*b*. Accordingly, in the schemes 400*a*, 400*b*, the BS 105*b* may initiate a channel-sensing protocol and selectively configure connected UEs to perform channel sensing. The x-axis represents time in some arbitrary units. In each of the schemes 400*a*, 400*b*, a first BS 105*a* has ongoing communications in a shared frequency band. A second BS 105*b*, which has a communication link with the UE 115*b*, will attempt to acquire a COT in the shared frequency band by performing receiver-assisted channel sensing (e.g., class A channel sensing). In the scheme 400*a* of FIG. 4A, the BS 105*b* configures the UE 115*b* to perform an interference measurement in a specific set of resources and for one or more specified beam directions. In the scheme 400*b*, the BS 105*b* triggers the UE 115*b* to perform an interference measurement, and the UE determines the timing and/or beam directions for the interference measurements.

Referring to FIG. 4A, a first BS 105*a* having ongoing in a shared frequency band transmits a series of bursts 402 in the shared frequency band, including burst 1, burst 2, and burst 3. The shared frequency band may be an unlicensed frequency band. Further, the bursts 402 may be transmitted using directional beamforming. A second BS 105*b* may attempt to schedule a data transmission in the shared frequency band. Accordingly, second BS 105*b* initiates a receiver-assisted channel sensing procedure. In particular, the second BS 105*b* triggers the UE 115*b* to perform an interference measurement at action 404. As explained above, triggering the interference measurement may include configuring the UE 115*b* with time/frequency resources for performing the interference measurement, and may also include configuring the UE 115*b* to measure interference in one or more specified beam directions.

At action 406, the UE 115*b* performs the interference measurement based on the interference measurement configuration. At action 408, the UE 115*b* transmits an interference measurement report to the second BS 105*b*. The report indicates the interference measurements for each of a plurality of beam directions, in some aspects. For example, the interference measurement report may include a RSSI report, a CSI report, or any other suitable type of report.

At action 410, based on the interference measurement report transmitted at action 408, the second BS 105*b* transmits receiver-assisted channel sensing configuration or trigger information to the UE 115*b*. The receiver-assisted channel sensing configuration information may include a report indicating the specific time/frequency resources for the UE 115*b* to perform channel sensing, and for reporting. The receiver-assisted channel sensing configuration information may include a semi-static configuration, which indicates a periodic set of time/frequency resources and/or one or more beam directions for performing channel sensing. In this regard, in some aspects, the second BS 105*b* transmits a single receiver-assisted channel sensing configuration to be used by the UE 115*b* for a plurality of periodic, successive time periods. In other aspects, the second BS 105*b* may provide the receiver-assisted channel sensing configuration information, or a receiver-assisted channel sensing trigger, to the UE 115*b* each time the BS 105*b* attempts to acquire a COT or each time the BS 105*b* initiates a MAC-CE beam switch command.

At action 412, the second BS 105*b* performs channel sensing to contend for the time/frequency resources in the shared frequency band. It will be understood that, in some aspects, the second BS 105*b* may perform the channel sensing at action 412 before transmitting the receiver-assisted channel sensing configuration information at action 410. That is, the BS 105*b* may obtain a COT and transmit the receiver-assisted channel sensing configuration information within the BS 105*b*'s COT. At action 414, the UE 115*b* performs channel sensing to assist the second BS 105*b* in determining whether the resources are available. In some aspects, the channel sensing performed at action 412 may be referred to as a clear channel assessment (CCA), which includes performing a LBT procedure to acquire a COT. At action 416, the UE 115*b* transmits a channel sensing report to the second BS 105*b*. The channel sensing report may indicate the measurements obtained in the channel sensing performed at action 414. For example, the report may indicate energy measurements obtained in a LBT. The second BS 105*b* may determine, based on the report transmitted at action 416, whether the COT is available. In some aspects, the second BS 105*b* may perform the channel sensing by performing a CAT2 LBT or a CAT4 LBT. Similarly, the UE may perform the channel sensing at action 414 by performing a CAT2 LBT or a CAT4 LBT. While FIG. 4 illustrates both the BS 105*b* and the UE 115*b* performing channel sensing at the same time at action 412 and action 414, respectively, in other aspects, the BS 105*b* and the UE 115*b* performing channel sensing at different times. For instance, the BS 105*b* may perform channel sensing before or after the UE 115.

Based on the channel measurements obtained at actions 412 and 414, the second BS 105*b* may determine whether the COT is available. For example, the second BS 105*b* may compare the channel measurements to a preconfigured threshold. If the channel measurements for both the second BS 105*b* and the UE 115*b* satisfy the threshold (e.g., are below the threshold), the second BS 105*b* may acquire the COT, and transmit DL communications and/or schedule UL communications in the COT. Accordingly, in the scheme 400*a* of FIG. 4A, the second BS 105*b* determines and triggers the receiver-assisted channel sensing procedure, including triggering the interference measurement at action 404, and configuring the UE 115*b* with the receiver-assisted channel sensing information at action 410.

Referring to the scheme 400*b* shown in FIG. 4B, the first BS 105*a* transmits a series of bursts 402 in a shared frequency band, similar to the scheme 400*a*. In the scheme 400*b*, the second BS 105*b* may trigger or indicate to the UE 115*b* to perform an interference measurement, but the UE 115*b* may determine one or more parameters of the interference measurement, including the timing of the measurements, the number of measurements, and/or the beams for performing the measurements. In this regard, the second BS 105*b* triggers the interference measurement at action 424, and the UE 115*b* performs two interference measurements at actions 426 and 428. In some aspects, action 424 may include indicating a first or initial time period for the UE 115*b* to perform an interference measurement (e.g., interference measurement 426), and the UE 115*b* may determine whether and when to perform one or more additional interference measurements (e.g., interference measurement 428). As similarly explained above, performing the interference measurement at actions 426 and 428 may include measuring a signal energy or power, such as a total signal energy or an average signal energy. For example, the UE 115*b* may measure a RSSI, RSRP, or any other suitable type of channel measurement for a time period. In some aspects, the UE 115*b* may perform the interference measurements by determining a SINR (e.g., L1-SINR). The UE 115*b* may perform the first interference measurement 426 in a first beam or beam direction, and may perform the second interference measurement 428 in a second beam or beam direction different from the first beam. In other aspects, the UE 115*b* may perform both interference measurements 426, 428 for a same beam.

At action 430, the UE 115*b* transmits an interference measurement report to the second BS 105*b* based on the interference measurements 426, 428. In some aspects, the report may indicate the measurements for each of the interference measurements 426, 428 separately, or may indicate the measurement jointly, or in the aggregate. In some aspects, the UE may report the interference measurement by transmitting a RSSI measurement report, a LI-SINR measurement report (e.g., AP-CSI report), a RSRP measurement report, or any other suitable type of measurement report. The measurement report may indicate measurements for individual beams or beam directions, in some aspects. In some instances, the measurement report may indicate a UE preference for receiver-assisted channel sensing. For example, the UE 115*b* may be configured to compare the interference measurements for each of a plurality of beam directions to a threshold, and indicate, to the second BS 105*b*, a preference for receiver-assisted channel sensing for each of the beam directions based on the comparison.

At action 432, based on the interference measurement report transmitted at action 430, the second BS 105*b* configures the UE 115*b* with receiver-assisted channel sensing configuration information. The receiver-assisted channel sensing configuration information may indicate channel sensing parameters to the UE 115*b*, such as time/frequency resources for the channel sensing, periodicity, beams or beam directions, thresholds, or any other suitable type of parameter.

Figure 5:
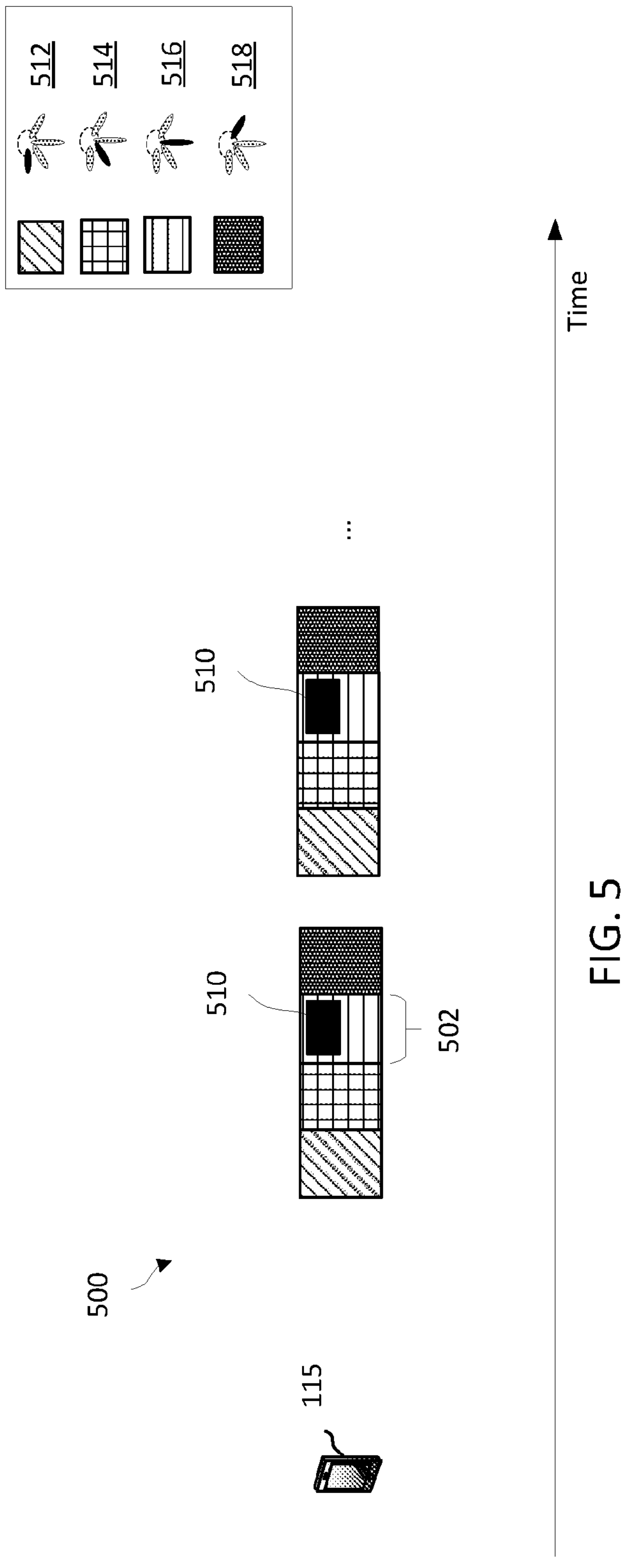
FIG. 5 illustrates a receiver-assisted channel sensing scheme in which a UE performs channel sensing in a single beam direction according to some aspects of the present disclosure.

FIG. 5 illustrates a receiver-assisted channel sensing scheme 500 in which a UE 115 performs channel sensing in a single beam direction 516. The x-axis represents time in some arbitrary units. As mentioned above, a BS 105 may configure a UE 115 to perform receiver-assisted channel sensing for one or more beam directions. In other aspects, the UE 115 may determine the beam directions for channel sensing autonomously. In the scheme 500 shown in FIG. 5, the UE 115 is configured to use receive beamforming to detect, receive, and/or measure signals in each of a plurality of beam directions 512, 514, 516, 518. The UE 115 may be configured to receive in each of the beam directions for a time period 502. The UE 115 may be configured to sweep or cycle through the beam directions 512, 514, 516, 518 as shown in FIG. 5. The UE 115 performs receiver-assisted channel sensing 510 in a third beam direction 516. The UE 115 performs the channel sensing periodically each time the UE sweeps through the third beam direction 516. In some aspects, the UE 115 may be configured to receive DL communications in one or more of the other beam directions. The scheme 500 may be used for one or more of the receiver-assisted channel sensing schemes described herein, including the schemes 300, 400*a*, 400*b*, 600, and/or 700.

Figure 6:
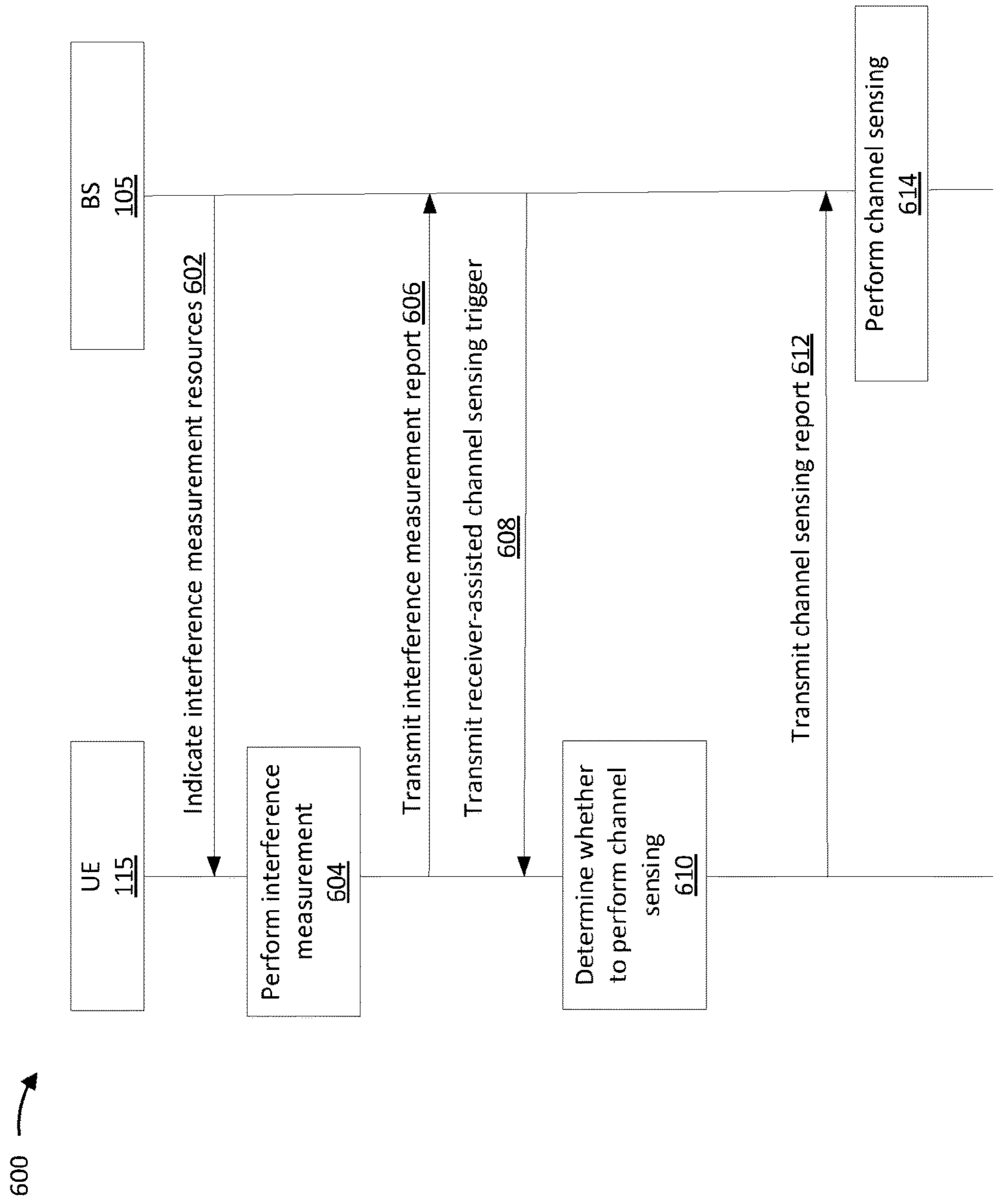
FIG. 6 is a signaling diagram for a method for receiver-assisted channel sensing, according to aspects of the present disclosure according to some aspects of the present disclosure.

FIG. 6 is a signaling diagram for a method 600 for receiver-assisted channel sensing, according to aspects of the present disclosure. In the method 600, the UE 115 is configured to determine whether and when to perform an interference measurement in response to receiving an interference measurement trigger from the BS 105. For example, the BS 105 may assume that all UEs will perform receiver-assisted channel sensing. The BS 105 may transmit a trigger to one or more of the UEs to perform an interference measurement. However, based on the capabilities of the UEs, operational mode, or power usage mode, it may be undesirable to perform interference measurements in some instances. For example, a UE operating using a power saving mode may prefer to refrain from performing interference measurements, or may prefer to perform the interference measurements less frequently. Accordingly, in the method 600, the UE 115 determines, based on UE capabilities, whether and/or how frequently to perform interference measurements.

At action 602, the BS 105 indicates interference measurement resources to the UE 115. In some aspects, action 602 may include transmitting a trigger to the UE 115 to perform an interference measurement, and the UE 115 receiving the trigger. In some aspects, action 602 includes the BS 105 transmitting, and the UE 115 receiving, an interference measurement configuration indicating the time/frequency resources for the interference measurements, a periodicity of the measurements, a duration or time window for each of the measurements, one or more beam directions for the interference measurements, and/or any other suitable parameters. For example, the interference measurement configuration may indicate a periodic set of time/frequency resources for the UE 115 to perform the interference measurement. In some aspects, action 602 may also include indicating channel sensing resources to the UE 115. Similar to the interference measurement resources, the channel sensing resources may be included in a channel sensing configuration which indicates time/frequency resources for the UE 115 to perform the channel sensing measurements, a duration or time window for the measurements, a periodicity for the measurements, and/or any other suitable parameter.

As explained above, the UE 115 may determine, in response to receiving the trigger at action 602, whether and/or how frequently to perform the interference measurements. At action 604, the UE 115 proceeds to perform an interference measurement (e.g., SINR, RSSI, etc.). In this regard, the UE 115 may determine, for the time period associated with the first interference measurement at action 604, that the UE capabilities and/or operational mode may allow for the interference measurement to be performed. For example, the UE may determine to perform the interference measurement based on a normal power usage mode (e.g., no power savings mode) being enabled. In some aspects, the UE 115 may perform the interference measurement in one or more beam directions, which may be configured by the BS 105 in the interference measurement configuration transmitted at 602. In other aspects, the UE 115 may determine the beam directions for performing the interference measurement at action 604.

At action 606, the UE 115 transmits, and the BS 105 receives, an interference measurement report. Transmitting the interference measurement report may include the UE 115 transmitting a RSSI report, a L1-SINR report (e.g., AP-CSI report), or any other suitable type of interference measurement report.

In some instances, the UE 115 may not perform the interference measurement and/or may not transmit the interference measurement report to the BS 105 based on a UE capability, a power saving mode, or any other suitable operating mode or parameter. For example, it may be undesirable to use power and/or time and frequency resources to perform the interference measurement and/or transmit the interference measurement report depending on the UE capabilities and operating parameters. Accordingly, the UE 115 may determine whether to perform the interference measurement, or refrain from measuring and transmitting the report.

In some aspects, action 606 includes the UE 115 transmitting, and the BS 105 receiving, an indication for the BS 105 to either schedule, or not schedule, the UE 115 for channel sensing. For example, if the UE 115 determines, based on UE capabilities, operating modes, and/or power status, not to perform channel sensing or an interference measurement, then the UE 115 may transmit a signal to the BS 105 indicating that the UE 115 is not clear to be scheduled. In other instances, the UE 115 may transmit a signal to the BS 105 indicating that the UE 115 is clear to be scheduled.

At action 608, the BS 105 transmits, and the UE 115 receives, a receiver-assisted channel sensing trigger to schedule the UE 115 for receiver-assisted channel sensing. In some aspects, action 608 may include the BS 105 transmitting, and the UE 115 receiving, channel sensing configuration information indicating the time/frequency resources for performing the channel sensing.

At action 610, the UE 115 determines, based on a UE capability, power saving mode, or other UE operating parameter, whether to perform receiver-assisted channel sensing. In some aspects, the UE 115 may determine in which beam directions of a plurality of beam directions the UE 115 will perform channel sensing.

At action 612, the UE 115 transmits, and the BS 105 receives, a channel sensing report. The report may be based on channel sensing measurements (e.g., signal energy measurements, SINR measurements, etc.) obtained by the UE 115 according to a LBT procedure. The UE 115 may indicate, in the report, signal measurements for each of a plurality of beam directions.

In some instances, a scheduled UE 115 determines not to perform channel sensing at action 608 based on a UE capability. For example, the UE 115 may determine to refrain from performing the channel sensing based on a receiver-transmitter turnaround, a power saving mode being enabled/disabled, or any other suitable UE capability or operating mode. In these instances, the UE 115 may refrain from sensing the channel and transmit, to the BS 105, a simulated interference measurement report for the time period associated with the resources of the interference measurement that was skipped. In some aspects, the simulated interference measurement report may comprise a nominal report indicating that the shared frequency band is available for transmission. In some aspects, the simulated interference measurement report may indicate that the shared frequency band is available or clear in each of a plurality of beam directions. In some aspects, the report may indicate a preference for the BS 105 to configure the UE 115 for channel sensing (e.g., class A channel sensing).

At action 614, the BS 105 performs channel sensing of the shared frequency band. In some aspects, the BS 105 may perform the channel sensing by performing a LBT procedure. The BS 105 may then determine, based on its own channel sensing measurements and the channel sensing report transmitted by the UE 115 at action 610, whether the shared frequency band is available for a COT.

In some aspects, a BS and/or a UE may determine whether and how to perform receiver-assisted channel sensing based on an operational mode of the UE, such as carrier aggregation, dual connectivity mode, single TRP, multi-TRP (described above with respect to FIG. 1B), or any other suitable mode. In carrier aggregation (CA) a UE can utilize two or more frequency bands or component carriers (CCs) to increase bandwidth. In some aspects, one CC may be used as an anchor carrier or a primary cell (Pcell) and another CC may be used as a supplemental carrier or a secondary cell (Scell). The Scell may include an uplink (UL) component carrier and a downlink (DL) component carrier. Alternatively, the Scell may include a DL component carrier only. In CA communication scenarios, cross-carrier scheduling may be used, whereby the UE monitors for downlink communication information (DCI) (e.g., downlink (DL) scheduling grants) on one cell (e.g., Pcell) and receives downlink data (e.g., in a physical downlink shared channel (PDSCH)) on another cell (e.g., Scell). Additionally or alternatively, the UE may monitor for the DCI (e.g., uplink (UL) scheduling grants) on one cell and transmit UL data (e.g., in a physical uplink shared channel (PUSCH)) on another cell. Dual connectivity (DC) similarly allows a UE to communicate using different cells, which are associated with different CCs. In Dual connectivity mode, a PScell may be used by a first transmitting node or BS, and a Scell may be used by a second transmitting node or BS that is physically or geographically spaced from the first transmitted node.

Figure 7:
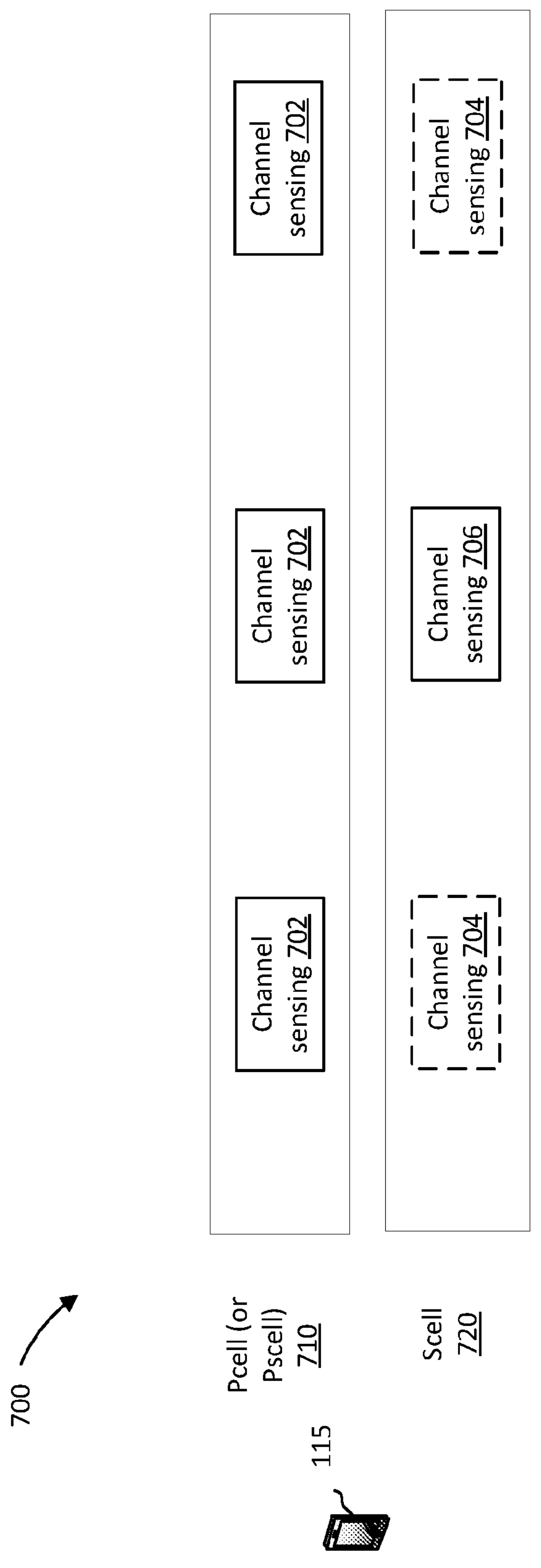
FIG. 7 illustrates a receiver-assisted channel sensing scheme 700 in a multi cell communication scenario according to some aspects of the present disclosure.

In some aspects, BS may configure a UE to perform receiver-assisted channel sensing based on carrier aggregation being enabled. For example, because a UE configured with carrier aggregation is served by multiple cells, the UE may be configured to perform channel sensing for one or more activated cells, and may refrain from performing channel sensing on other cells. That is, instead of performing receiver-assisted channel sensing in all served cells, a UE may perform receiver-assisted channel sensing in the served cell(s) that carry more critical communication such as control information or scheduling information FIG. 7 illustrates a receiver-assisted channel sensing scheme 700 in a multi-cell communication scenario. The method 700 is performed by a UE 115, which may be one of the UEs 115 of the network 100. Aspects of the method 700 may also be performed by a BS, such as one of the BSs 105 of the network 100. The x-axis represents time in some arbitrary units. The multi cell communication scenario may be a carrier aggregation (CA) communication scenario or a dual connectivity (DC) communication scenario. In this regard, the UE 115 is configured to communication with a BS, such as one of the BSs 105 of the network 100, using a primary cell (Pcell 710) and one or more secondary cells (Scell 720). In DC, the Pcell 710 may be a PScell. In the scheme 700, the UE 115 is configured to perform the receiver-assisted channel sensing based on the enabled multi cell communication mode. In particular, the UE 115 may be configured to perform receiver-assisted channel sensing on at least the Pcell 710, as shown in FIG. 7.

In the scheme 700, the UE 115 is configured with a set of periodic channel sensing resources 702 to perform receiver-assisted channel sensing, such as class A channel sensing. The UE 115 may be configured to perform the channel sensing in each of the configured resources 702. In some aspects, the UE 115 may also be configured with a set of periodic resources 704, 706 for performing channel sensing in the Scell 720. In other aspects, the UE 115 may not be configured with channel sensing resources in the Scell 720.

In the scheme 700, the UE 115 is configured to perform channel sensing less frequently using the Scell 720 than using the Pcell 710. For example, the UE 115 is configured to perform channel sensing in a second channel sensing resource 706, and refrain from performing channel sensing in the Scell 720 for the other channel sensing resources 704. In general, the UE 115 may be configured with different receiver-assisted sensing configurations, and the UE 115 may perform receiver-assisted channel sensing in the configured cell and provide a corresponding BS with receiver-assisted channel sensing information, for example, using substantially similar mechanisms as discussed above with references to FIGS. 3, 4A, 4B, 5, and 6. In some aspects, the BS 105 may configure the UE 115 not to perform any receiver-assisted sensing.

In other aspects, the UE 115 may be configured to perform channel sensing based on a transmission reception point configuration, such as single TRP or multi-TRP. Single TRP and multi-TRP are described above with respect to FIG. 1B. For example, the UE 115 may be configured to perform channel sensing based on multi-TRP being enabled. In this regard, multi-TRP communication scenarios may result in high interference at nodes in the network, since multiple TRPs are used to strengthen a communication signal for a certain node and therefore another node may experience interference that are combined across the multiple TRPs. Accordingly, when multi-TRP is enabled, it may be beneficial or advantageous to configure the UEs in the network to perform receiver-assisted channel sensing to reduce the chance of collisions during a COT in the shared frequency band. In general, the BS 105 may configure a UE 115 to perform receiver-assisted channel sensing based on whether the BS 105 utilizes a single TRP or multiple TRPs to communicate with the UE 115.

Figure 8:
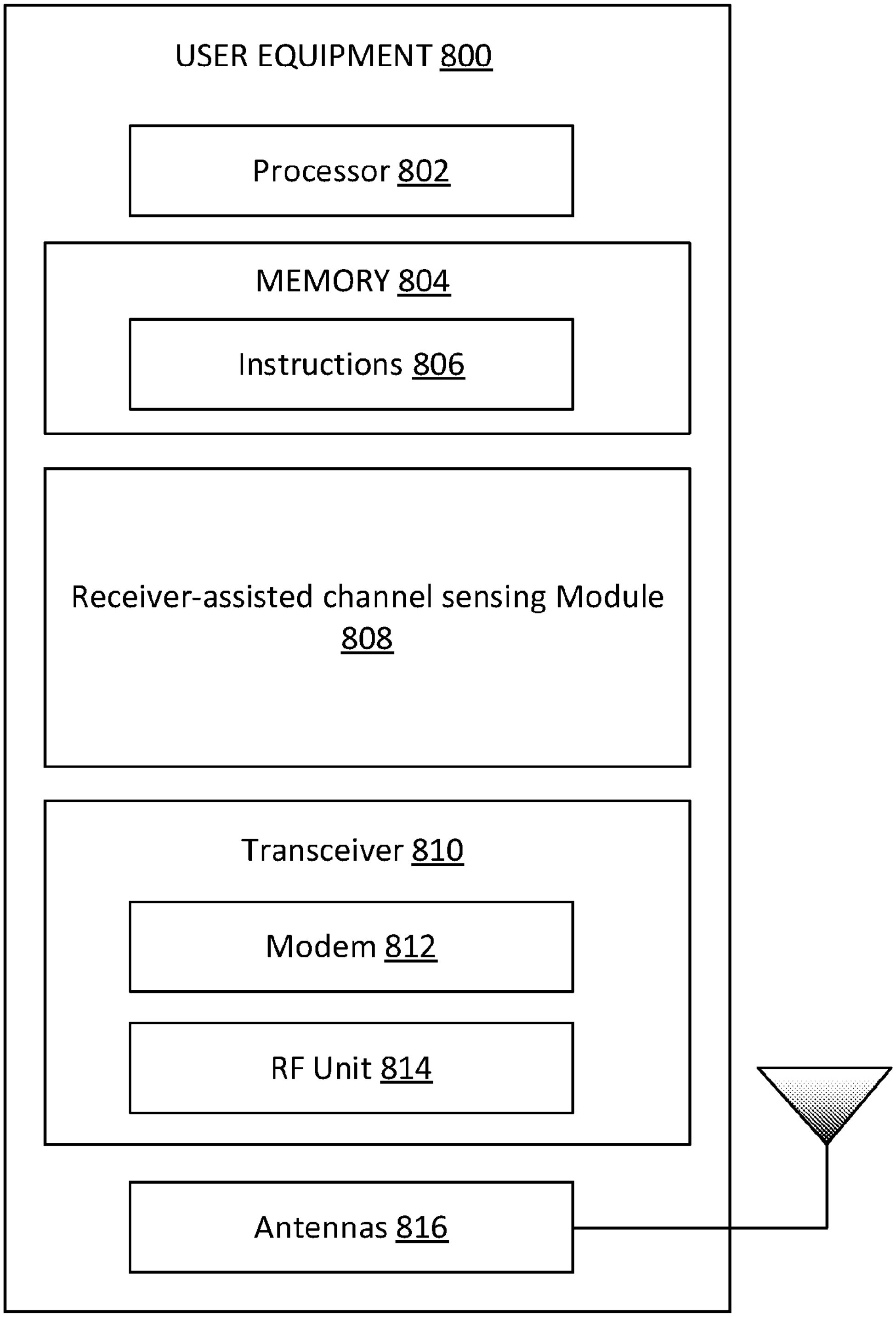
FIG. 8 is a block diagram of a user equipment (UE) according to some aspects of the present disclosure.

FIG. 8 is a block diagram of an exemplary UE 800 according to some aspects of the present disclosure. The UE 800 may be a UE 115 discussed above in FIG. 1. As shown, the UE 800 may include a processor 802, a memory 804, an Receiver-assisted channel sensing module 808, a transceiver 810 including a modem subsystem 812 and a radio frequency (RF) unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 2-7 and 10. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The Receiver-assisted channel sensing module 808 may be implemented via hardware, software, or combinations thereof. For example, the Receiver-assisted channel sensing module 808 may be implemented as a processor, circuit, and/or instructions 806 stored in the memory 804 and executed by the processor 802. In some instances, the Receiver-assisted channel sensing module 808 can be integrated within the modem subsystem 812. For example, the Receiver-assisted channel sensing module 808 can be implemented by a combination of software components (e.g., executed by a DSP or a general processor) and hardware components (e.g., logic gates and circuitry) within the modem subsystem 812.

The Receiver-assisted channel sensing module 808 may be used for various aspects of the present disclosure, for example, aspects of aspects of FIGS. 3-7 and 10. The Receiver-assisted channel sensing module 808 is configured to sense a channel based on at least one of a receiver-assisted channel sensing trigger, or a UE capability, and transmit, to a BS based on the sensing, channel sensing information. In some aspects, the Receiver-assisted channel sensing module 808 is configured to sense the channel associated with a primary cell while operating in a carrier aggregation mode, and. In some aspects, Receiver-assisted channel sensing module 808 is configured to sense the channel associated with a primary cell in at least one of a master cell group (MCG) or a secondary cell group (SCG) while operating in a dual connectivity (DC) mode. In some aspects, the Receiver-assisted channel sensing module 808 is configured to sense the channel associated with a primary cell or a secondary cell of a secondary cell group (SCG).

In some aspects, the Receiver-assisted channel sensing module 808 is configured to receive, from the BS, the receiver-assisted channel sensing trigger, and sense the channel in response to receiving the receiver-assisted channel sensing trigger. In some aspects, the Receiver-assisted channel sensing module 808 is configured to receive, from the BS, a receiver-assisted channel sensing configuration, and sense the channel based on the receiver-assisted channel sensing configuration. In some aspects, the receiver-assisted channel sensing configuration indicates one or more beams for the sensing. In some aspects, the Receiver-assisted channel sensing module 808 is configured to receive a pre-channel occupancy time (pre-COT) signal indicating one or more beams for the sensing. In some aspects, the Receiver-assisted channel sensing module 808 is configured to receive a media access control control element (MAC-CE) indicating a serving beam switch and one or more beams for the sensing.

In some aspects, the Receiver-assisted channel sensing module 808 is configured to receive, from the BS, an interference measurement configuration indicating one or more interference measurement resources; transmit, to the BS, an interference measurement report based on a measurement associated with at least a first interference measurement resource of the one or more interference measurement resources; and sense the channel based on the measurement. In some aspects, the Receiver-assisted channel sensing module 808 is configured to transmit the interference measurement report including an indication of a received signal strength indicator (RSSI) measurement in a beam direction associated with the first interference measurement resource. In some aspects, the Receiver-assisted channel sensing module 808 is configured to transmit the interference measurement report including an indication of a signal-to-interference ratio (SINR) measurement in a beam direction associated with the first interference measurement resource. In some aspects, the Receiver-assisted channel sensing module 808 is configured to transmit the interference measurement report including an indication of a UE preference for sensing the channel. In some aspects, t the Receiver-assisted channel sensing module 808 is configured to transmit the interference measurement report further including a request for a receiver-assisted channel sensing trigger, the request being based on the measurement.

In some aspects, the Receiver-assisted channel sensing module 808 is configured to determine whether to perform the sensing based on at least one of a transmit-receive switching time or a power status associated with the UE. In some aspects, the Receiver-assisted channel sensing module 808 is configured to receive, from the BS, an interference measurement configuration indicating one or more interference measurement resources, and transmit, to the BS, an indication that the channel is clear without measuring in the one or more interference measurement resources.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the Receiver-assisted channel sensing module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUCCH control information, PRACH signals, PUSCH data) from the modem subsystem 812 (on outbound transmissions) or of transmissions originating from another source such as another UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., DCI, SSBs, RMSI, MIB, SIB, FBE configuration, PRACH configuration PDCCH, PDSCH, LBT configuration, interference measurement configuration, interference measurement report, channel sensing report) to the Receiver-assisted channel sensing module 808 for processing. The antennas 816 may include multiple antennas of similar or different designs in order to sustain multiple transmission links. The RF unit 814 may configure the antennas 816.

In an aspect, the UE 800 can include multiple transceivers 810 implementing different RATs (e.g., NR and LIE). In an aspect, the UE 800 can include a single transceiver 810 implementing multiple RATs (e.g., NR and LTE). In an aspect, the transceiver 810 can include various components, where different combinations of components can implement different RATs.

Figure 9:
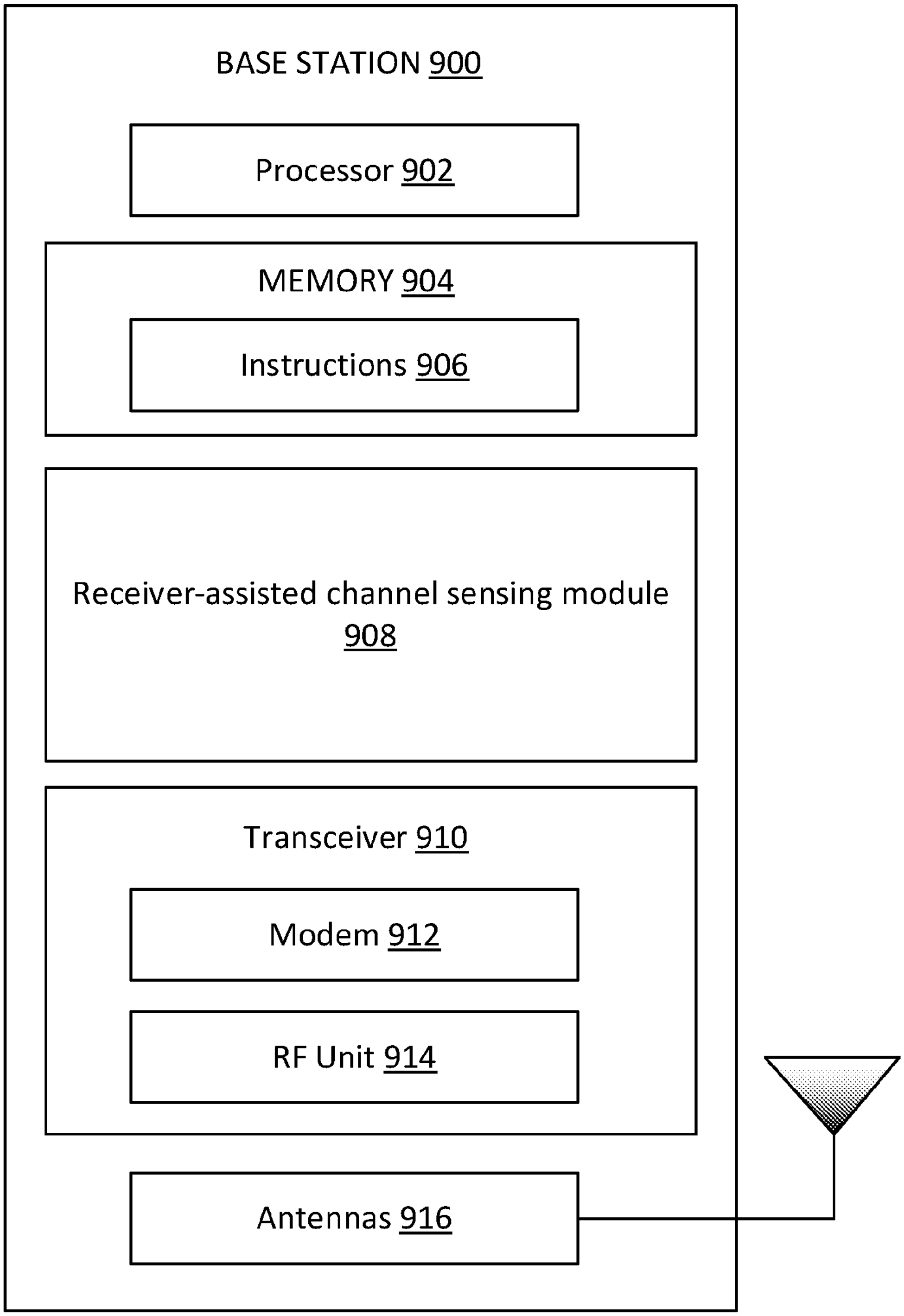
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 in the network 100 as discussed above in FIGS. 1 and 3A. A shown, the BS 900 may include a processor 902, a memory 904, an Receiver-assisted channel sensing module 908, a transceiver 910 including a modem subsystem 912 and a RF unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 2-7 and 11. Instructions 906 may also be referred to as code, which may be interpreted broadly to include any type of computer-readable statement(s) as discussed above.

The Receiver-assisted channel sensing module 908 may be implemented via hardware, software, or combinations thereof. For example, the Receiver-assisted channel sensing module 908 may be implemented as a processor, circuit, and/or instructions 906 stored in the memory 904 and executed by the processor 902. In some instances, the Receiver-assisted channel sensing module 908 can be integrated within the modem subsystem 912. For example, the Receiver-assisted channel sensing module 908 can be implemented by a combination of software components (e.g., executed by a DSP or a general processor) and hardware components (e.g., logic gates and circuitry) within the modem subsystem 912.

The Receiver-assisted channel sensing module 908 may be used for various aspects of the present disclosure, for example, aspects of aspects of FIGS. 3-7 and 11. The Receiver-assisted channel sensing module 908 can be configured to transmit, to a user equipment (UE), a trigger for performing receiver-assisted channel sensing, wherein the trigger is based on at least one of an interference measurement report transmitted by the UE or a UE operational mode. The Receiver-assisted channel sensing module 908 may be further configured to receive, from the UE, channel sensing information based on the receiver-assisted channel sensing.

In some aspects, the Receiver-assisted channel sensing module 908 is configured to receive the channel sensing information for a primary cell while operating in a carrier aggregation mode. In some aspects, the Receiver-assisted channel sensing module 908 is configured to receive the channel sensing information for a primary cell while operating in a carrier aggregation mode. In some aspects, the Receiver-assisted channel sensing module 908 is configured to receive the channel sensing information for a primary cell while operating in a carrier aggregation mode. In some aspects, the Receiver-assisted channel sensing module 908 is configured to receive the channel sensing information for a primary cell in at least one of a master cell group (MCG) or a secondary cell group (SCG) while operating in a dual connectivity (DC) mode. In some aspects, the Receiver-assisted channel sensing module 908 is configured to receive the channel sensing information for a primary cell or a secondary cell of a secondary cell group (SCG).

In some aspects, the Receiver-assisted channel sensing module 908 is configured to transmit, to the UE, a receiver-assisted channel sensing configuration. In some aspects, the Receiver-assisted channel sensing module 908 is configured to transmit a pre-channel occupancy time (pre-COT) signal indicating one or more beams for the sensing. In some aspects, the Receiver-assisted channel sensing module 908 is configured to transmit a media access control control element (MAC-CE) indicating a serving beam switch and one or more beams for the sensing. In some aspects, the Receiver-assisted channel sensing module 908 is configured to communicate, with the UE via one or more transmission and reception points (TRPs), a communication. In some aspects, the Receiver-assisted channel sensing module 908 is configured to transmit the trigger based on a number of the one or more TRPs. In some aspects, the Receiver-assisted channel sensing module 908 is configured to transmit, to the UE, an interference measurement configuration indicating one or more interference measurement resources and receive, from the UE, an interference measurement report based on a measurement associated with at least a first interference measurement resource of the one or more interference measurement resources.

In some aspects, the Receiver-assisted channel sensing module 908 is configured to receive the interference measurement report including an indication of a received signal strength indicator (RSSI) measurement in a beam direction associated with the first interference measurement resource. In some aspects, the Receiver-assisted channel sensing module 908 is configured to receive the interference measurement report including an indication of a signal-to-interference ratio (SINR) measurement in a beam direction associated with the first interference measurement resource. In some aspects, the Receiver-assisted channel sensing module 908 is configured to receive the interference measurement report including an indication of a UE preference for sensing the channel. In some aspects, the Receiver-assisted channel sensing module 908 is configured to receive the interference measurement report including a request for a receiver-assisted channel sensing trigger, the request being based on the measurement.

As shown, the transceiver 910 may include the modem subsystem 912 and the RF unit 914. The transceiver 910 can be configured to communicate bi-directionally with other devices, such as the UEs 115 and/or 800, another BS 105, and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH, LBT configuration, interference measurement configuration, interference measurement report, channel sensing report) from the modem subsystem 912 (on outbound transmissions) or of transmissions originating from another source, such as a UE 115. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices and provide the received data messages for processing and/or demodulation at the transceiver 910. The transceiver 910 may provide the demodulated and decoded data (e.g., PUCCH control information, PRACH signals, PUSCH data, LBT configuration, interference measurement configuration, interference measurement report, channel sensing report) to the Receiver-assisted channel sensing module 908 for processing. The antennas 916 may include multiple antennas of similar or different designs in order to sustain multiple transmission links.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

Figure 10:
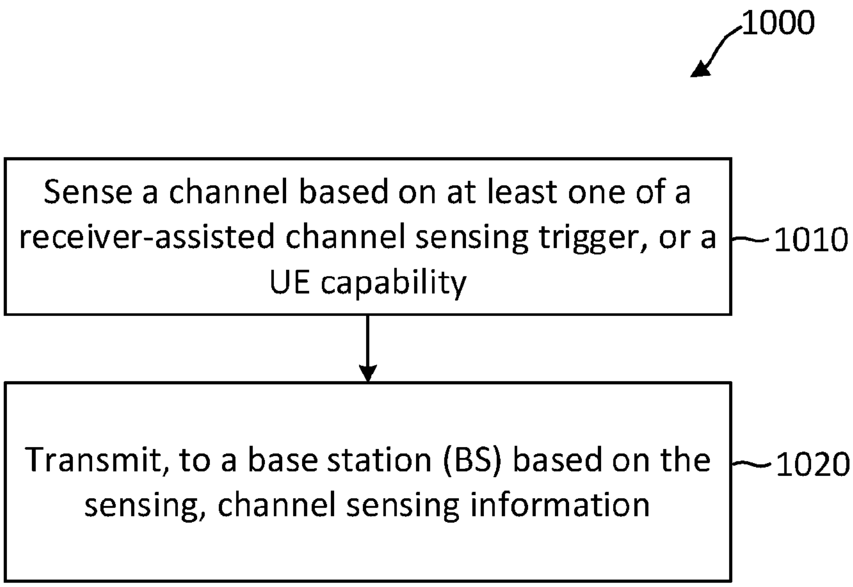
FIG. 10 is a flow diagram of a communication method according to some aspects of the present disclosure.

FIG. 10 is a flow diagram of a communication method 1000 according to some aspects of the present disclosure. Steps of the method 1000 can be executed by a computing device (e.g., a processor, processing circuit, and/or other suitable component) of an apparatus or other suitable means for performing the steps. For example, a UE, such as UEs 115 and/or 800, may utilize one or more components, such as the processor 802, the memory 804, the Receiver-assisted channel sensing module 808, the transceiver 810, and the one or more antennas 816, to execute the steps of method 1000. The method 1000 may employ similar mechanisms as described above with respect to FIGS. 3-7. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the UE senses a channel based on at least one of a receiver-assisted channel sensing trigger, or a UE capability. In some aspects, the sensing includes sensing the channel associated with a primary cell while operating in a carrier aggregation mode. In some aspects, the sensing includes sensing the channel associated with a primary cell in at least one of a master cell group (MCG) or a secondary cell group (SCG) while operating in a dual connectivity (DC) mode. In some aspects, the sensing includes sensing the channel associated with a primary cell or a secondary cell of a secondary cell group (SCG). The UE may utilize one or more components, such as the processor 802, the memory 804, the Receiver-assisted channel sensing module 808, the transceiver 810, and the one or more antennas 816, to execute the actions of block 1010.

At block 1020, the UE transmits, to a BS based on the sensing, channel sensing information. The UE may utilize one or more components, such as the processor 802, the memory 804, the Receiver-assisted channel sensing module 808, the transceiver 810, and the one or more antennas 816, to execute the actions of block 1020.

In some aspects, the method 1000 further includes the UE receiving, from the BS, the receiver-assisted channel sensing trigger, and the sensing comprises: sensing the channel in response to receiving the receiver-assisted channel sensing trigger. In some aspects, the method further includes the UE receiving, from the BS, a receiver-assisted channel sensing configuration, and the sensing comprises: sensing the channel based on the receiver-assisted channel sensing configuration. In some aspects, the receiver-assisted channel sensing configuration indicates one or more beams for the sensing. In some aspects, receiving the receiver-assisted channel sensing configuration comprises: receiving a pre-channel occupancy time (pre-COT) signal indicating one or more beams for the sensing. In some aspects, receiving the receiver-assisted channel sensing configuration comprises: receiving a media access control control element (MAC-CE) indicating a serving beam switch and one or more beams for the sensing.

In some aspects, the method 1000 further includes: receiving, from the BS, an interference measurement configuration indicating one or more interference measurement resources; and transmitting, to the BS, an interference measurement report based on a measurement associated with at least a first interference measurement resource of the one or more interference measurement resources, and the sensing is further based on the measurement. In some aspects, the transmitting the interference measurement report comprises: transmitting interference measurement report including an indication of a received signal strength indicator (RSSI)

measurement in a beam direction associated with the first interference measurement resource. In some aspects, the transmitting the interference measurement report comprises: transmitting the interference measurement report including an indication of a signal-to-interference ratio (SINR) measurement in a beam direction associated with the first interference measurement resource. In some aspects, the transmitting the interference measurement report comprises: transmitting the interference measurement report including an indication of a UE preference for sensing the channel. In some aspects, the transmitting the interference measurement report comprises: transmitting the interference measurement report further including a request for a receiver-assisted channel sensing trigger, the request being based on the measurement.

In some aspects, the method 1000 further includes determining whether to perform the sensing based on at least one of a transmit-receive switching time or a power status associated with the UE. In some aspects, the method 1000 further includes receiving, from the BS, an interference measurement configuration indicating one or more interference measurement resources; and transmitting, to the BS, an indication that the channel is clear without measuring in the one or more interference measurement resources. The UE may utilize one or more components, such as the processor 802, the memory 804, the Receiver-assisted channel sensing module 808, the transceiver 810, and the one or more antennas 816, to execute the additional actions of the method 1000 described above.

Figure 11:
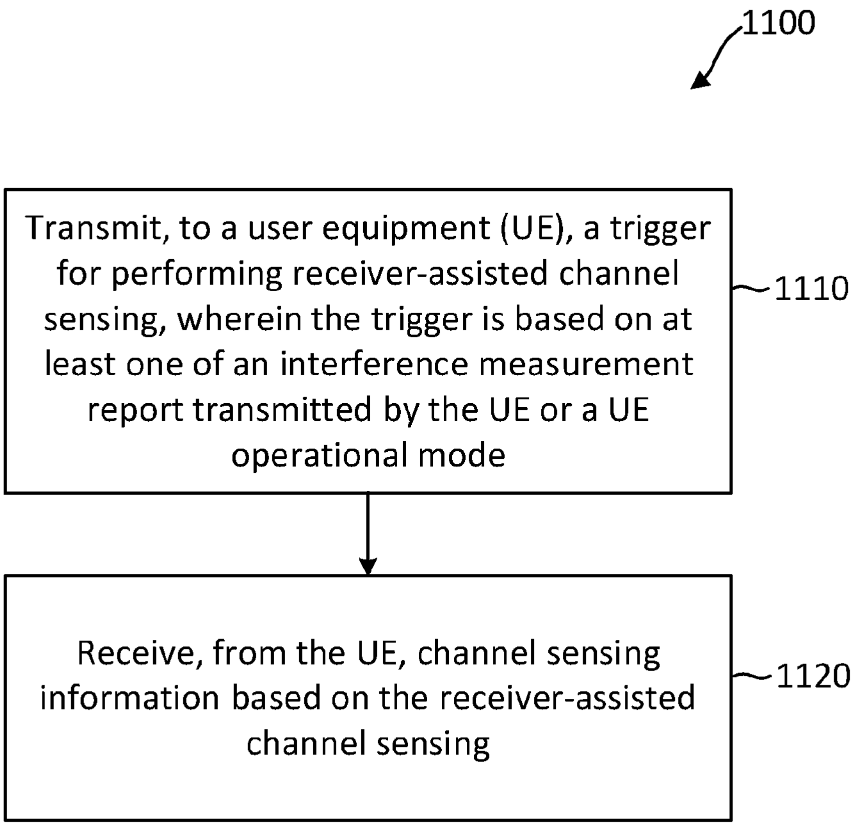
FIG. 11 is a flow diagram of a communication method according to some aspects of the present disclosure.

FIG. 11 is a flow diagram of a communication method 1100 according to some aspects of the present disclosure. Steps of the method 1100 can be executed by a computing device (e.g., a processor, processing circuit, and/or other suitable component) of an apparatus or other suitable means for performing the steps. For example, a BS, such as the BSs 105 and/or 900, may utilize one or more components, such as the processor 902, the memory 904, the Receiver-assisted channel sensing module 908, the transceiver 910, and the one or more antennas 916, to execute the steps of method 1100. The method 1100 may employ similar mechanisms as described above with respect to FIGS. 3-7. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the BS transmits, to a user equipment (UE), a trigger for performing receiver-assisted channel sensing, wherein the trigger is based on at least one of an interference measurement report transmitted by the UE or a UE operational mode. In some aspects, receiving the channel sensing information comprises receiving the channel sensing information for a primary cell while operating in a carrier aggregation mode. In some aspects, the receiving the channel sensing information comprises receiving the channel sensing information for a primary cell in at least one of a master cell group (MCG) or a secondary cell group (SCG) while operating in a dual connectivity (DC) mode. In some aspects, the receiving the channel sensing information comprises receiving the channel sensing information for a primary cell or a secondary cell of a secondary cell group (SCG). The BS may utilize one or more components, such as the processor 902, the memory 904, the Receiver-assisted channel sensing module 908, the transceiver 910, and the one or more antennas 916, to execute the actions of block 1110.

At block 1120, the BS receives, from the UE, channel sensing information based on the receiver-assisted channel sensing. The BS may utilize one or more components, such as the processor 902, the memory 904, the Receiver-assisted channel sensing module 908, the transceiver 910, and the one or more antennas 916, to execute the actions of block 1120.

In some aspects, the method 1100 further includes transmitting, to the UE, a receiver-assisted channel sensing configuration. In some aspects, the receiver-assisted channel sensing configuration indicates one or more beams for the sensing. In some aspects, transmitting the transmitting the receiver-assisted channel sensing configuration comprises transmitting a pre-channel occupancy time (pre-COT) signal indicating one or more beams for the sensing. In some aspects, transmitting the receiver-assisted channel sensing configuration comprises: transmitting a media access control control element (MAC-CE) indicating a serving beam switch and one or more beams for the sensing. In some aspects, the method 1100 further includes communicating, with the UE via one or more transmission and reception points (TRPs), a communication. In some aspects, transmitting the trigger comprises transmitting the trigger based on a number of the one or more TRPs. In some aspects, the method 1100 further includes transmitting, to the UE, an interference measurement configuration indicating one or more interference measurement resources; and receiving, from the UE, an interference measurement report based on a measurement associated with at least a first interference measurement resource of the one or more interference measurement resources. In some aspects, the transmitting the trigger is further based on the measurement.

In some aspects, receiving the interference measurement report comprises receiving the interference measurement report including an indication of a received signal strength indicator (RSSI) measurement in a beam direction associated with the first interference measurement resource. In some aspects, receiving the interference measurement report comprises receiving the interference measurement report including an indication of a signal-to-interference ratio (SINR) measurement in a beam direction associated with the first interference measurement resource. In some aspects, receiving the interference measurement report comprises receiving the interference measurement report including an indication of a UE preference for sensing the channel. In some aspects, receiving the interference measurement report comprises receiving the interference measurement report including a request for a receiver-assisted channel sensing trigger, the request being based on the measurement.

Aspects of the present disclosure also include the following:

1. A method for wireless communication performed by a user equipment (UE), the method comprising:
   sensing a channel based on at least one of a receiver-assisted channel sensing trigger, or a UE capability; and
   transmitting, to a base station (BS) based on the sensing, channel sensing information.
2. The method of clause 1, further comprising:
   receiving, from the BS, the receiver-assisted channel sensing trigger,
   wherein the sensing comprises:
      sensing the channel in response to receiving the receiver-assisted channel sensing trigger.

3. The method of any of clauses 1-2, further comprising: receiving, from the BS, a receiver-assisted channel sensing configuration, wherein the sensing comprises:
sensing the channel based on the receiver-assisted channel sensing configuration.
4. The method of clause 3,
wherein the receiver-assisted channel sensing configuration indicates one or more beams for the sensing.
5. The method of any of clauses 3-4,
wherein the receiving the receiver-assisted channel sensing configuration comprises:
receiving a pre-channel occupancy time (pre-COT) signal indicating one or more beams for the sensing.
6. The method of any of clauses 3-4,
wherein the receiving the receiver-assisted channel sensing configuration comprises:
receiving a media access control control element (MAC-CE) indicating a serving beam switch and one or more beams for the sensing.
7. The method of any of clauses 1-6,
wherein the sensing comprises:
sensing the channel associated with a primary cell while operating in a carrier aggregation mode.
8. The method of clause 7,
wherein the sensing comprises:
sensing the channel associated with a primary cell in at least one of a master cell group (MCG) or a secondary cell group (SCG) while operating in a dual connectivity (DC) mode.
9. The method of clause 7,
wherein the sensing comprises:
sensing the channel associated with a primary cell or a secondary cell of a secondary cell group (SCG).
10. The method of any of clauses 1-6,
further comprising:
communicating, with the BS via one or more transmission and reception points (TRPs), a communication,
wherein the sensing comprises
sensing the channel based on a number of the one or more TRPs.
11. The method of any of clauses 1-10, further comprising:
receiving, from the BS, an interference measurement configuration indicating one or more interference measurement resources; and
transmitting, to the BS, an interference measurement report based on a measurement associated with at least a first interference measurement resource of the one or more interference measurement resources,
wherein the sensing is further based on the measurement.
12. The method of clause 11, wherein the transmitting the interference measurement report comprises:
transmitting interference measurement report including an indication of a received signal strength indicator (RSSI) measurement in a beam direction associated with the first interference measurement resource.
13. The method of clause 11, wherein the transmitting the interference measurement report comprises:
transmitting the interference measurement report including an indication of a signal-to-interference ratio (SINR) measurement in a beam direction associated with the first interference measurement resource.
14. The method of any of clauses 11-13, wherein the transmitting the interference measurement report comprises:
transmitting the interference measurement report including an indication of a UE preference for sensing the channel.
15. The method of any of clauses 11-14, wherein the transmitting the interference measurement report comprises:
transmitting the interference measurement report further including a request for a receiver-assisted channel sensing trigger, the request being based on the measurement.
16. The method of any of clauses 11-15, further comprising:
determining whether to perform the sensing based on at least one of a transmit-receive switching time or a power status associated with the UE.
17. The method of any of clauses 1-16, further comprising:
receiving, from the BS, an interference measurement configuration indicating one or more interference measurement resources; and
transmitting, to the BS, an indication that the channel is clear without measuring in the one or more interference measurement resources.
18. A method for wireless communication performed by a base station (BS), the method comprising:
transmitting, to a user equipment (UE), a trigger for performing receiver-assisted channel sensing, wherein the trigger is based on at least one of an interference measurement report transmitted by the UE or a UE operational mode; and
receiving, from the UE, channel sensing information based on the receiver-assisted channel sensing.
19. The method of clause 18, further comprising:
transmitting, to the UE, a receiver-assisted channel sensing configuration.
20. The method of clause 19,
wherein the receiver-assisted channel sensing configuration indicates one or more beams for the sensing.
21. The method of any of clauses 19-20,
wherein the transmitting the receiver-assisted channel sensing configuration comprises:
transmitting a pre-channel occupancy time (pre-COT) signal indicating one or more beams for the sensing.
22. The method of any of clauses 19-20,
wherein the transmitting the receiver-assisted channel sensing configuration comprises:
transmitting a media access control control element (MAC-CE) indicating a serving beam switch and one or more beams for the sensing.
23. The method of any of clauses 19-22,
wherein the receiving the channel sensing information comprises:
receiving the channel sensing information for a primary cell while operating in a carrier aggregation mode.
24. The method of clause 23,
wherein the receiving the channel sensing information comprises:
receiving the channel sensing information for a primary cell in at least one of a master cell group (MCG) or a secondary cell group (SCG) while operating in a dual connectivity (DC) mode.

25. The method of clause 23,
wherein the receiving the channel sensing information comprises:
receiving the channel sensing information for a primary cell or a secondary cell of a secondary cell group (SCG).
26. The method of any of clauses 18-22,
further comprising:
communicating, with the UE via one or more transmission and reception points (TRPs), a communication,
wherein the transmitting the trigger comprises:
transmitting the trigger based on a number of the one or more TRPs.
27. The method of any of clauses 18-26, further comprising:
transmitting, to the UE, an interference measurement configuration indicating one or more interference measurement resources; and
receiving, from the UE, an interference measurement report based on a measurement associated with at least a first interference measurement resource of the one or more interference measurement resources,
wherein the transmitting the trigger is further based on the measurement.
28. The method of clause 27, wherein the receiving the interference measurement report comprises:
receiving the interference measurement report including an indication of a received signal strength indicator (RSSI) measurement in a beam direction associated with the first interference measurement resource.
29. The method of clause 27, wherein the receiving the interference measurement report comprises:
receiving the interference measurement report including an indication of a signal-to-interference ratio (SINR) measurement in a beam direction associated with the first interference measurement resource.
30. The method of any of clauses 27-29, wherein the receiving the interference measurement report comprises:
receiving the interference measurement report including an indication of a UE preference for sensing the channel.
31. The method of any of clauses 27-30, wherein the receiving the interference measurement report comprises:
receiving the interference measurement report including a request for a receiver-assisted channel sensing trigger, the request being based on the measurement.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method for wireless communication performed by a user equipment (UE), the method comprising:
receiving a receiver-assisted channel sensing trigger via a pre-channel occupancy time (pre-COT) signal indicating one or more beams for sensing a channel;
sensing the channel in response to receiving the pre-COT signal,
wherein sensing the channel comprises measuring a signal energy or power during a sensing period; and
transmitting, based on the sensing, channel sensing information including signal measurements.

2. The method of claim 1, further comprising:
receiving, from a network node, a receiver-assisted channel sensing configuration; and
wherein sensing the channel comprises:
sensing the channel based on the receiver-assisted channel sensing configuration.

3. The method of claim 2, wherein the receiver-assisted channel sensing configuration indicates one or more beams for sensing the channel.

4. The method of claim 2, wherein receiving the receiver-assisted channel sensing configuration comprises:
receiving a media access control control element (MAC-CE) indicating a serving beam switch and one or more beams for sensing the channel.

5. The method of claim 1, wherein sensing the channel comprises:
sensing the channel associated with a primary cell while operating in a carrier aggregation mode.

6. The method of claim 1, wherein sensing the channel comprises:

sensing the channel associated with a primary cell in at least one of a master cell group (MCG) or a secondary cell group (SCG) while operating in a dual connectivity (DC) mode.

7. The method of claim 1, wherein sensing the channel comprises:

sensing the channel associated with a primary cell or a secondary cell of a secondary cell group (SCG).

8. The method of claim 1, further comprising:

communicating, with a network node via one or more transmission and reception points (TRPs), a communication; and wherein sensing the channel comprises:

sensing the channel based on a quantity of the one or more TRPs.

9. The method of claim 1, further comprising:

receiving, from a network node, an interference measurement configuration indicating one or more interference measurement resources; and transmitting, to the network node, an interference measurement report based on a measurement associated with at least a first interference measurement resource of the one or more interference measurement resources; and wherein sensing the channel comprises:

sensing the channel based on the measurement.

10. The method of claim 9, wherein the interference measurement report includes an indication of a received signal strength indicator (RSSI) measurement in a beam direction associated with the first interference measurement resource.

11. The method of claim 9, wherein the interference measurement report includes an indication of a signal-to-interference ratio (SINR) measurement in a beam direction associated with the first interference measurement resource.

12. The method of claim 9, wherein the interference measurement report includes an indication of a UE preference for sensing the channel.

13. The method of claim 9, wherein the interference measurement report includes a request for the receiver-assisted channel sensing trigger, the request being based on the measurement.

14. The method of claim 1, further comprising:

determining whether to perform sensing the channel based on at least one of a transmit-receive switching time or a power status associated with the UE.

15. The method of claim 1, further comprising:

receiving, from a network node, an interference measurement configuration indicating one or more interference measurement resources; and transmitting, to the network node, an indication that the channel is clear without measuring in the one or more interference measurement resources.

16. A user equipment (UE), comprising:

one or more antennas; and a processing system that includes one or more processors and one or more memories that store code and are coupled with the one or more processors, the processing system configured to cause the UE to:

receive a receiver-assisted channel sensing trigger via a pre-channel occupancy time (pre-COT) signal indicating one or more beams for sensing a channel;

sense the channel in response to the pre-COT signal, wherein the processing system, to sense the channel, is configured to cause the UE to measure a signal energy or power during a sensing period; and transmit channel sensing information including signal measurements.

17. The UE of claim 16, wherein the processing system is further configured to:

receive, from a network node, an interference measurement configuration indicating one or more interference measurement resources; and transmit, to the network node, an interference measurement report based on a measurement associated with at least a first interference measurement resource of the one or more interference measurement resources; and wherein the processing system, to sense the channel, is configured to cause the UE to:

sense the channel based on the measurement.

18. The UE of claim 16, wherein the processing system is further configured to:

determine whether to perform sensing of the channel based on at least one of a transmit-receive switching time or a power status associated with the UE.

19. The UE of claim 16, wherein the processing system is further configured to:

receive, from a network node, an interference measurement configuration indicating one or more interference measurement resources; and transmit, to the network node, an indication that the channel is clear without measuring in the one or more interference measurement resources.

20. The UE of claim 16, wherein the processing system is further configured to cause the UE to:

receive, from a network node, a receiver-assisted channel sensing configuration; and wherein the processing system, to sense the channel, is configured to cause the UE to:

sense the channel based on the receiver-assisted channel sensing configuration.

21. The UE of claim 20, wherein the receiver-assisted channel sensing configuration indicates one or more beams for sensing the channel.

22. The UE of claim 20, wherein the processing system, to receive the receiver-assisted channel sensing configuration, is configured to cause the UE to:

receive a media access control control element (MAC-CE) indicating a serving beam switch and one or more beams for sensing the channel.

23. The UE of claim 16, wherein the processing system, to sense the channel, is configured to cause the UE to:

sense the channel associated with a primary cell while operating in a carrier aggregation mode.

24. The UE of claim 16, wherein the processing system, to sense the channel, is configured to cause the UE to:

sense the channel associated with a primary cell in at least one of a master cell group (MCG) or a secondary cell group (SCG) while operating in a dual connectivity (DC) mode.

25. A non-transitory, computer-readable medium storing a set of instructions, the set of instructions comprising:

one or more instructions that, when executed by one or more processors of a user equipment (UE), cause the UE to:

receive a receiver-assisted channel sensing trigger via a pre-channel occupancy time (pre-COT) signal indicating one or more beams for sensing a channel;

sense the channel in response to the pre-COT signal, wherein the one or more instructions, to cause the UE to sense the channel, are configured to cause the UE to measure a signal energy or power during a sensing period; and transmit channel sensing information including signal measurements.

26. The non-transitory, computer-readable medium of claim 25, wherein the one or more instructions are further configured to cause the UE to:

receive, from a network node, an interference measurement configuration indicating one or more interference measurement resources; and transmit, to the network node, an interference measurement report based on a measurement associated with at least a first interference measurement resource of the one or more interference measurement resources; and wherein the one or more instructions, to cause the UE to sense the channel, cause the UE to:

sense the channel based on the measurement.

27. The non-transitory, computer-readable medium of claim 25, wherein the one or more instructions are further configured to cause the UE to:

determine whether to perform sensing of the channel based on at least one of a transmit-receive switching time or a power status associated with the UE.

28. An apparatus for wireless communication, comprising:

means for receiving a receiver-assisted channel sensing trigger via a pre-channel occupancy time (pre-COT) signal indicating one or more beams for sensing a channel;

means for sensing the channel in response to receiving the pre-COT signal; and means for transmitting, based on sensing the channel, channel sensing information including signal measurements.

29. The apparatus of claim 28, further comprising:

means for receiving, from a network node, an interference measurement configuration indicating one or more interference measurement resources; and means for transmitting, to the network node, an interference measurement report based on a measurement associated with at least a first interference measurement resource of the one or more interference measurement resources; and wherein the means for sensing the channel comprises:

means for sensing the channel based on the measurement.

30. The apparatus of claim 28, further comprising:

means for determining whether to perform sensing of the channel based on at least one of a transmit-receive switching time or a power status associated with the apparatus.

* * * * *